US012706399B2

(12) United States Patent
Yoo et al.

(10) Patent No.: US 12,706,399 B2
(45) Date of Patent: Aug. 11, 2026

(54) CONNECTOR AND ELECTRONIC DEVICE COMPRISING SAME

(71) Applicants: SAMSUNG ELECTRONICS CO., LTD., Suwon-si (KR); POCONS CO., LTD., Suwon-si (KR)

(72) Inventors: Joon Yoo, Suwon-si (KR); Hanseok Mun, Suwon-si (KR); Jaeryong Han, Suwon-si (KR); Jaejin Oh, Suwon-si (KR); Jangwon Hur, Suwon-si (KR)

(73) Assignees: SAMSUNG ELECTRONICS CO., LTD., Suwon-si (KR); POCONS CO., LTD., Suwon-si (KR)

(*) Notice: Subject to any disclaimer, the term of this patent is extended or adjusted under 35 U.S.C. 154(b) by 409 days.

(21) Appl. No.: 18/399,443

(22) Filed: Dec. 28, 2023

(65) Prior Publication Data

US 2024/0128661 A1 Apr. 18, 2024

Related U.S. Application Data

(63) Continuation of application No. PCT/KR2022/007677, filed on May 30, 2022.

(30) Foreign Application Priority Data

Jul. 6, 2021 (KR) ........................ 10-2021-0088560
May 4, 2022 (KR) ........................ 10-2022-0055298

(51) Int. Cl.
*H01R 4/34* (2006.01)
*H04M 1/02* (2006.01)

(52) U.S. Cl.
CPC ............ *H01R 4/34* (2013.01); *H04M 1/0202* (2013.01)

(58) Field of Classification Search
CPC ... H01R 4/34; H01R 4/36; H01R 4/38; H01R 4/489; H01R 4/64; H01R 4/32–46; H04M 1/0202

(Continued)

(56) References Cited

U.S. PATENT DOCUMENTS 5,624,319 A 4/1997 Golczyk et al.
6,017,226 A * 1/2000 Jeffries .................. H05K 7/142 361/679.6

(Continued)

FOREIGN PATENT DOCUMENTS

CN 203892338 10/2014
JP 2644462 B2 8/1997

(Continued)

OTHER PUBLICATIONS

International Search Report for PCT/KR2022/007677 dated Sep. 8, 2022, 5 pages.

(Continued)

*Primary Examiner* — Tulsidas C Patel
*Assistant Examiner* — Thaslimur Rahman
(74) *Attorney, Agent, or Firm* — Nixon & Vanderhye, P.C.

(57) ABSTRACT

Disclosed is an electronic device according to various embodiments. The electronic device includes: a housing including a metal portion and a polymer portion, a substrate disposed in the housing, a connector disposed in the housing and that electrically connecting the metal portion and the substrate, and a screw fastening the metal portion of the housing and the connector and passing through the connector and at least a portion of the metal portion. The connector includes: a base portion seated on the metal portion and through which the screw passes, a movable portion at least partially facing the base portion and through which the (Continued)

screw passes, a bending portion connecting one side of the base portion and the movable portion, and a connecting portion extending from an opposite side of the base portion and connected to the substrate.

20 Claims, 26 Drawing Sheets

(58) Field of Classification Search
USPC .......................................................... 439/86
See application file for complete search history.

(56) References Cited

U.S. PATENT DOCUMENTS

| | | | | |
|---|---|---|---|---|
| 6,727,430 | B1 | 4/2004 | Franks, Jr. | |
| 6,933,442 | B2 | 8/2005 | Franks, Jr. | |
| 7,874,534 | B2 | 1/2011 | Kobayashi | |
| 8,116,087 | B2 | 2/2012 | Lo | |
| 8,303,357 | B2 | 11/2012 | Kuwahara et al. | |
| 9,291,180 | B2 | 3/2016 | Nakazato et al. | |
| 9,318,802 | B2 | 4/2016 | Smith et al. | |
| 9,876,273 | B2 * | 1/2018 | Lui | H01Q 1/243 |
| 11,153,422 | B2 | 10/2021 | Mifune et al. | |
| 11,259,407 | B2 | 2/2022 | Shim et al. | |
| 2001/0041113 | A1 | 11/2001 | Antonucci et al. | |
| 2004/0154818 | A1 * | 8/2004 | Franks, Jr. | H01R 4/643 174/51 |
| 2008/0095592 | A1 | 4/2008 | Spitz | |
| 2008/0290229 | A1 | 11/2008 | Kobayashi | |
| 2010/0259907 | A1 | 10/2010 | Lo | |
| 2015/0033511 | A1 | 2/2015 | Nakazato et al. | |
| 2016/0064810 | A1 | 3/2016 | Smith et al. | |
| 2016/0276757 | A1 | 9/2016 | Smith et al. | |
| 2017/0094818 | A1 * | 3/2017 | Kim | H04M 1/0277 |
| 2018/0159249 | A1 * | 6/2018 | Bernard | H01R 4/4821 |
| 2018/0358722 | A1 * | 12/2018 | Park | H05K 5/0069 |
| 2020/0375026 | A1 | 11/2020 | Shim et al. | |
| 2021/0050690 | A1 * | 2/2021 | Savicki, Jr. | H01R 13/652 |

FOREIGN PATENT DOCUMENTS

| | | | |
|---|---|---|---|
| JP | 2001012440 | A | 1/2001 |
| JP | 2003133762 | A | 5/2003 |
| JP | 2007315580 | A | 12/2007 |
| JP | 2008103505 | A | 5/2008 |
| JP | 2008527251 | A | 7/2008 |
| JP | 2008300635 | A | 12/2008 |
| JP | 2013148168 | A | 8/2013 |
| JP | 5829752 | B2 | 10/2015 |
| JP | 2021044781 | A | 3/2021 |
| KR | 20110128729 | A | 11/2011 |
| KR | 20140131225 | A | 11/2014 |
| KR | 20160119621 | A | 10/2016 |
| KR | 10-2017-0036360 | | 4/2017 |
| KR | 20200134068 | A | 12/2020 |

OTHER PUBLICATIONS

Written Opinion of the ISA for PCT/KR2022/007677 dated Sep. 8, 2022, 3 pages.

Extended European Search Report dated Sep. 18, 2024 issued in European Patent Application No. 22837821.2.

* cited by examiner

CONNECTOR AND ELECTRONIC DEVICE COMPRISING SAME

CROSS-REFERENCE TO RELATED APPLICATIONS

This application is a continuation of International Application No. PCT/KR2022/007677 designating the United Staes, filed on May 30, 2022, in the Korean Intellectual Property Receiving Office and claiming priority to Korean Patent Application Nos. 10-2021-0088560, filed on Jul. 6, 2021, and 10-2022-0055298, filed on May 4, 2022, in the Korean Intellectual Property Office, the disclosures of each of which are incorporated by reference herein in their entireties.

BACKGROUND

Field

The disclosure relates to a connector and an electronic device including the same.

Description of Related Art

An electronic device may include a connector to electrically connect a substrate and an electrically conductive structure. The connector may be physically/electrically coupled to the electrically conductive structure using a screw. The connector may be connected to the substrate through soldering. The connector may contact an electrically conductive pad of the substrate.

The connector in the related art has a relatively small effective contact distance, and therefore the reliability of a visual inspection for determining whether the screw is completely fastened may be low. Furthermore, the connector may be excessively plastically deformed when the screw is fastened and therefore may not be able to be reassembled, and when the screw is loosened, electrical contact between the screw and the connector may be easily released.

SUMMARY

Various embodiments of the disclosure provide a connector having a sufficient effective contact distance and reassembly performance and an electronic device including the connector.

An electronic device according to an example embodiment of the disclosure includes: a housing including a metal portion and a polymer portion, a substrate disposed in the housing, a connector disposed in the housing and electrically connecting the metal portion and the substrate, and a screw fastening the metal portion of the housing and the connector and passing through the connector and at least a portion of the metal portion. The connector includes: a base portion seated on the metal portion and through which the screw is configured to pass, a movable portion at least partially facing the base portion and through which the screw is configured to pass, a bending portion connecting one side of the base portion and the movable portion, and a connecting portion extending from an opposite side of the base portion and connected to the substrate.

An electronic device according to an example embodiment of the disclosure includes: a housing, a first electrically conductive structure comprising a conductive material and a second electrically conductive structure comprising a conductive material disposed in the housing, and a connector disposed in the housing. The connector includes: a base portion at least partially contacting the first electrically conductive structure, a first movable portion extending from the base portion at a first angle and extending to be inclined in a first direction away from the base portion, and a second movable portion extending from the first movable portion at a second angle, extending to be inclined in the first direction away from the first movable portion, and at least partially contacting the second electrically conductive structure. The second movable portion is configured to be compressed by the second electrically conductive structure and is configured to press the second electrically conductive structure in the first direction.

The connectors according to the various example embodiments of the disclosure may provide an elastic force to consistently maintain electrical contact even when a screw is incompletely fastened. Furthermore, when the screw is fastened, stress may be distributed so that relatively small plastic deformation may occur, and thus reassembly performance may be improved.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described with reference to accompanying drawings. Accordingly, those of ordinary skill in the art will recognize that various modifications, equivalents, and/or alternatives of the various embodiments described herein can be variously made without departing from the scope and spirit of the disclosure.

Figure 1:
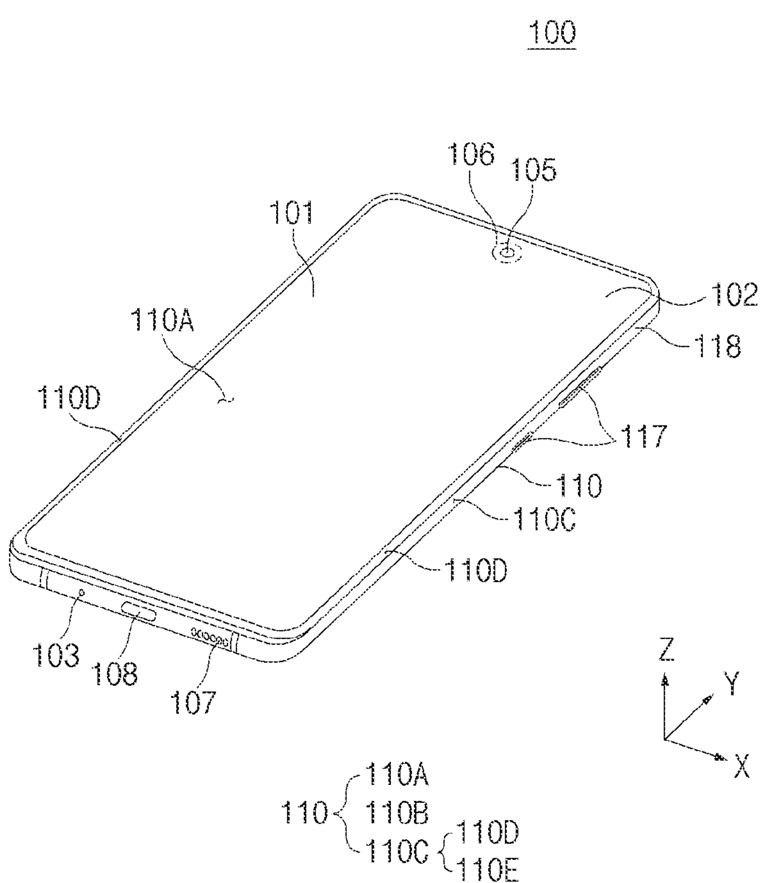
FIG. 1 is a front perspective view of an electronic device according to various embodiments.
Figure 2:
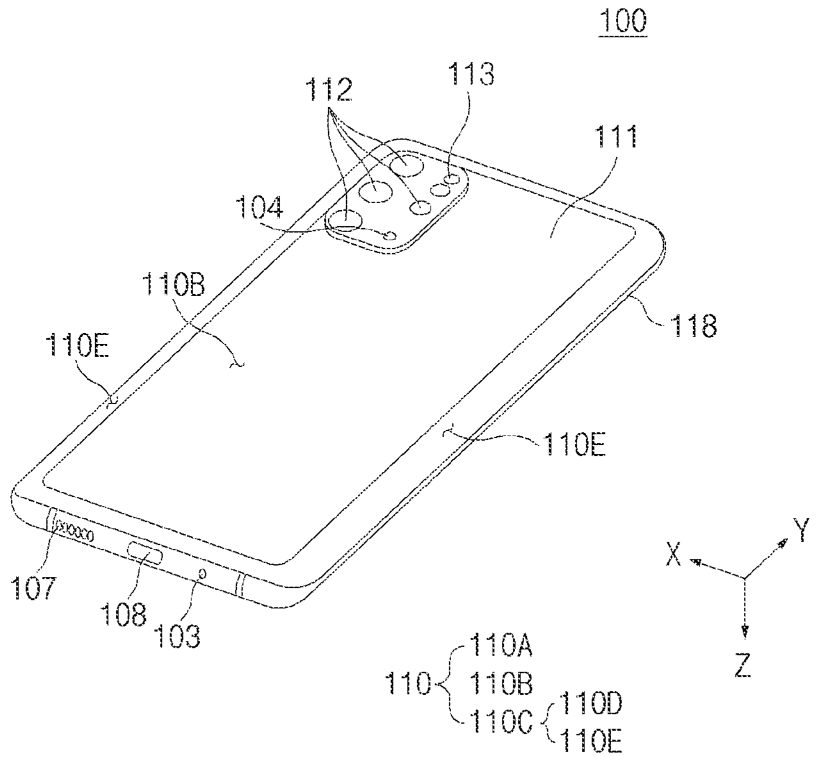
FIG. 2 is a rear perspective view of the electronic device according to various embodiments.
Figure 3:
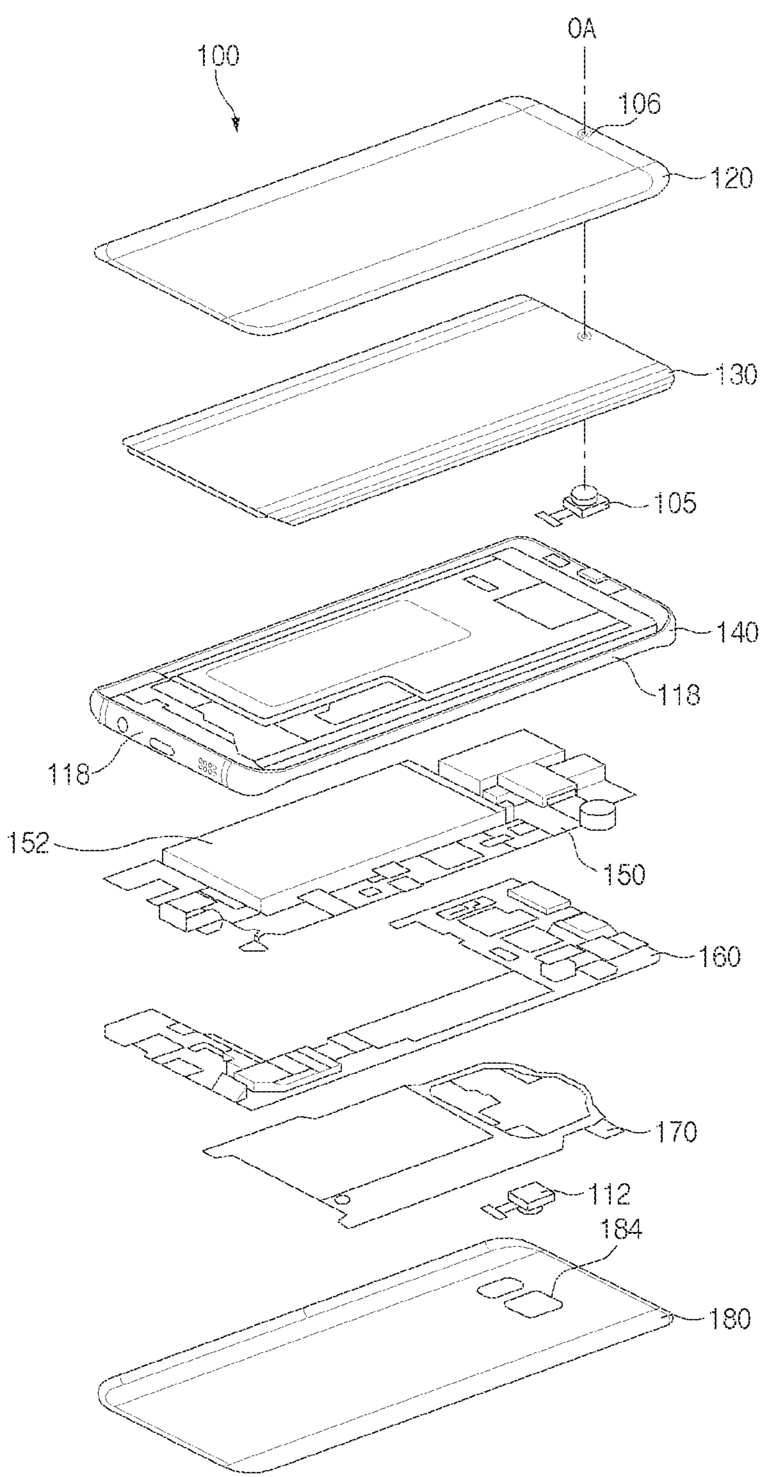
FIG. 3 is an exploded perspective view of the electronic device according to various embodiments.

FIG. 1 is a front perspective view of an electronic device 100 according to various embodiments. FIG. 2 is a rear perspective view of the electronic device 100 according to various embodiments. FIG. 3 is an exploded perspective view of the electronic device 100 according to various embodiments.

Referring to FIGS. 1 and 2, the electronic device 100 may include a housing 110 that includes a first surface (or, a front surface) 110A, a second surface (or, a rear surface) 110B, and a side surface 110C surrounding a space between the first surface 110A and the second surface 110B.

In an embodiment (not illustrated), the housing 110 may refer to a structure that forms some of the first surface 110A, the second surface 110B, and the side surface 110C.

In an embodiment, the first surface 110A may be formed by a front plate 102 (e.g., a front plate 120 of FIG. 3), at least a portion of which is substantially transparent. The front plate 102 may include a glass plate including various coating layers or a polymer plate. In an embodiment, the second surface 110B may be formed by a back plate 111 (e.g., a back plate 180 of FIG. 3) that is substantially opaque. The back plate 111 may be formed of, for example, coated or colored glass, ceramic, a polymer, metal (e.g., aluminum, stainless steel (STS), or magnesium), or a combination of at least two of the aforementioned materials. The side surface 110C may be formed by a side bezel structure 118 that is coupled with the front plate 102 and the back plate 111 and that contains metal and/or a polymer.

In an embodiment, the back plate 111 and the side bezel structure 118 may be integrally formed with each other and may contain the same material (e.g., a metallic material such as aluminum).

In the illustrated embodiment, the front plate 102 may include two first areas 110D that curvedly and seamlessly extend from partial areas of the first surface 110A toward the back plate 111. The first areas 110D may be located at opposite long edges of the front plate 102.

In the illustrated embodiment, the back plate 111 may include two second areas 110E that curvedly and seamlessly extend from partial areas of the second surface 110B toward the front plate 102. The second areas 110E may be located at opposite long edges of the back plate 111.

In an embodiment, the front plate 102 (or, the back plate 111) may include only one of the first areas 110D (or, the second areas 110E). Furthermore, in an embodiment, the front plate 102 (or, the back plate 111) may not include at least a part of the first areas 110D (or, the second areas 110E).

In an embodiment, when viewed from a side of the electronic device 100, the side bezel structure 118 may have a first thickness (or, width) at sides (e.g., short sides) not including the first areas 110D or the second areas 110E and may have a second thickness at sides (e.g., long sides) including the first areas 110D or the second areas 110E, the second thickness being smaller than the first thickness. However, the disclosure is not limited thereto. For example, when the electronic device 100 does not include the first areas 110D and the second areas 110E, the first thickness and the second thickness may be substantially the same as each other.

In an embodiment, the electronic device 100 may include at least one of a display 101, audio modules 103, 104, and 107, a sensor module (not illustrated), camera modules 105 and 112, key input devices 117, a light emitting element (not illustrated), or a connector hole 108. In an embodiment, at least one component (e.g., the key input devices 117 or the light emitting element (not illustrated)) among the aforementioned components may be omitted from the electronic device 100, or other component(s) may be additionally included in the electronic device 100.

In an embodiment, the display 101 may be visible through at least a portion of the front plate 102. For example, at least a portion of the display 101 may be visible through the front plate 102 that includes the first surface 110A and the first areas 110D of the side surface 110C.

In an embodiment, the shape of the display 101 may be formed to be substantially the same as the shape of the adjacent outside edge of the front plate 102. In an embodiment (not illustrated), to expand the area by which the display 101 is visible, the gap between the periphery of the display 101 and the periphery of the front plate 102 may be formed to be substantially constant.

In an embodiment, a surface of the housing 110 (or, the front plate 102) may include a display area through which the display 101 is visible and on which contents are displayed through pixels of the display 101. For example, the display area may include the first surface 110A and the first areas 110D of the side surface.

In an embodiment (not illustrated), the display area 110A and 110D may include a sensing area (not illustrated) that is configured to obtain biometric information of a user. Here, when the display area 110A and 110D includes the sensing area, this may refer, for example, to at least a portion of the sensing area overlapping the display area 110A and 110D. For example, the sensing area (not illustrated) may refer to an area capable of displaying contents by the display 101 like the other areas of the display area 110A and 110D and additionally obtaining biometric information (e.g., a fingerprint) of the user.

In an embodiment, the display area 110A and 110D of the display 101 may include a camera area 106. For example, the camera area 106 may be an area through which light reflected from an object and received to the first camera module 105 passes. For example, the camera area 106 may include an area through which an optical axis of the first camera module 105 passes. When the display area 110A and 110D includes the camera area 106, this may refer, for example, to at least a portion of the camera area 106 overlapping the display area 110A and 110D. For example, likewise to the other areas of the display area 110A and 110D, the camera area 106 may display contents by the display 101.

In various embodiments (not illustrated), the screen display area 110A and 110D of the display 101 may include an area through which the first camera module 105 (e.g., a punch hole camera) is visually exposed. For example, at least a portion of the periphery of the area through which the first camera module 105 is exposed may be surrounded by the screen display area 110A and 110D. In an embodiment, the first camera module 105 may include a plurality of camera modules.

In an embodiment, the electronic device 100 may include, on the rear surface of the screen display area 110A and 110D of the display 101, at least one of the audio modules 103, 104, and 107, the sensor module (not illustrated), a camera module (e.g., the first camera module 105), or the light emitting element (not illustrated). For example, the camera module (e.g., the first camera module 105) may be disposed on the rear side (e.g., the side facing the −Z-axis direction) of the first surface 110A (e.g., the front surface) and/or the side surface 110C (e.g., at least one surface of the first areas 110D) so as to face toward the first surface 110A and/or the side surface 110C. For example, the first camera module 105 may include an under display camera (UDC) that is hidden without being visually exposed on the screen display area 110A and 110D.

In an embodiment (not illustrated), the display 101 may include, or may be disposed adjacent to, touch detection circuitry, a pressure sensor for measuring the intensity (pressure) of a touch, and/or a digitizer for detecting a stylus pen of a magnetic field type.

In an embodiment, the audio modules 103, 104, and 107 may include the microphone holes 103 and 104 and the speaker hole 107.

In an embodiment, the microphone holes 103 and 104 may include the first microphone hole 103 formed in a partial area of the side surface 110C and the second microphone hole 104 formed in a partial area of the second surface 110B. Microphones for obtaining external sounds may be disposed in the housing 110 to correspond to the microphone holes 103 and 104. The microphones may each include a plurality of microphones to detect the direction of sound. In an embodiment, the second microphone hole 104 formed in the partial area of the second surface 110B may be disposed adjacent to the camera modules 105 and 112. For example, the second microphone hole 104 may obtain sounds when the camera modules 105 and 112 are executed, or may obtain sounds when other functions are executed.

In an embodiment, the speaker hole 107 may include a receiver hole for telephone call (not illustrated). The speaker hole 107 may be formed in a portion of the side surface 110C of the electronic device 100. In an embodiment, the speaker hole 107, together with the microphone hole 103, may be implemented as a single hole. Although not illustrated, the receiver hole for telephone call (not illustrated) may be formed in another portion of the side surface 110C. For example, the receiver hole for telephone call (not illustrated) may be formed in another portion (e.g., a portion facing the +Y-axis direction) of the side surface 110C that faces the portion (e.g., a portion facing the −Y-axis direction) of the side surface 110C in which the speaker hole 107 is formed.

In an embodiment, the electronic device 100 may include a speaker fluidly connected with the speaker hole 107. In an embodiment, the speaker may include a piezoelectric speaker that does not include the speaker hole 107.

In an embodiment, the sensor module (not illustrated) may generate an electrical signal or a data value that corresponds to an operational state inside the electronic device 100 or an environmental state external to the electronic device 100. In an embodiment, the sensor module (not illustrated) may be disposed on at least a part of the first surface 110A, the second surface 110B, or the side surface 110C (e.g., the first areas 110D and/or the second areas 110E) of the housing 110 and may be disposed (e.g., a fingerprint sensor) on the rear surface of the display 101. For example, at least a portion of the sensor module (not illustrated) may be disposed under the display area 110A and 110D and may not be visually exposed, and the sensing area (not illustrated) may be formed in at least a portion of the display area 110A and 110D. For example, the sensor module (not illustrated) may include an optical fingerprint sensor. In various embodiments (not illustrated), the fingerprint sensor may be disposed on the second surface 110B as well as the first surface 110A of the housing 110 (e.g., the screen display area 110A and 110D). For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the key input devices 117 may be disposed on the side surface 110C of the housing 110 (e.g., the first areas 110D and/or the second areas 110E). In an embodiment, the electronic device 100 may not include all or some of the key input devices 117, and the key input devices 117 not included may be implemented in a different form, such as a soft key, on the display 101. In an embodiment, the key input devices may include a sensor module (not illustrated) that forms the sensing area (not illustrated) that is included in the display area 110A and 110D.

In an embodiment, the connector hole 108 may accommodate a connector. The connector hole 108 may be disposed in the side surface 110C of the housing 110. For example, the connector hole 108 may be disposed in the side surface 110C so as to be adjacent to at least a part of the audio modules (e.g., the microphone hole 103 and the speaker hole 107). In an embodiment, the electronic device 100 may include the first connector hole 108 capable of accommodating a connector (e.g., a USB connector) for transmitting/receiving power and/or data with an external electronic device, and/or a second connector hole (not illustrated) capable of accommodating a connector (e.g., an earphone jack) for transmitting/receiving audio signals with an external electronic device.

In an embodiment, the electronic device 100 may include the light emitting element (not illustrated). For example, the light emitting element (not illustrated) may be disposed on the first surface 110A of the housing 110. The light emitting element (not illustrated) may provide state information of the electronic device 100 in the form of light. In an embodiment, the light emitting element (not illustrated) may provide a light source that operates in conjunction with operation of the first camera module 105. For example, the light emitting element (not illustrated) may include an LED, an IR LED, and/or a xenon lamp.

In an embodiment, the camera modules 105 and 112 may include the first camera module 105 (e.g., an under display camera) configured to receive light through the camera area 106 of the first surface 110A of the electronic device 100, the second camera module 112 configured to receive light through a partial area of the second surface 110B (e.g., a rear camera area 184 of FIG. 3), and/or a flash 113.

In an embodiment, the first camera module 105 may include an under display camera (UDC) disposed on the rear surface of the display 101. For example, the first camera module 105 may be located in some layers of the display 101, or may be located such that an optical axis of a lens passes through the display area 110A and 110D of the display 101. In various embodiments, the first camera module 105 may be configured to receive light through the camera area 106 included in the display area 110A and 110D. For example, the camera area 106 may be configured to display contents like the other areas of the display area 110A and 110D when the first camera module 105 does not operate. For example, when the first camera module 105 operates, the camera area 106 may not display contents, and the first camera module 105 may receive light through the camera area 106.

In various embodiments (not illustrated), the first camera module 105 (e.g., a punch hole camera) may be exposed through a portion of the display area 110A and 110D of the display 101. For example, the first camera module 105 may be exposed on a partial area of the screen display area 110A and 110D through an opening formed in a portion of the display 101.

In an embodiment, the second camera module 112 may include a plurality of camera modules (e.g., a dual camera, a triple camera, or a quad camera). However, the second camera module 112 is not necessarily limited to including the plurality of camera modules and may include one camera module. In an embodiment, the first camera module 105 and/or the second camera module 112 may include one or more lenses, an image sensor, and/or an image signal processor. The flash 113 may include, for example, a light emitting diode or a xenon lamp. In an embodiment, two or more lenses (an infrared camera lens, a wide angle lens, and a telephoto lens) and image sensors may be disposed in the housing to face a direction that one surface (e.g., the second surface 110B) of the electronic device 100 faces.

Referring to FIG. 3, the electronic device 100 may include the side bezel structure 118, a first support member 140 (e.g., a bracket), the front plate 120 (e.g., the front plate 102 of FIG. 1), a display 130 (e.g., the display 101 of FIG. 1), a printed circuit board 150 (e.g., a printed circuit board (PCB), a flexible PCB (FPCB), or a rigid-flexible PCB (RFPCB)), a battery 152, a second support member 160 (e.g., a rear case), an antenna 170, and the back plate 180 (e.g., the back plate 111 of FIG. 2). In various embodiments, the electronic device 100 may not include at least one component (e.g., the first support member 140 or the second support member 160) among the aforementioned components, or may additionally include other component(s). At least one of the components of the electronic device 100 may be identical or similar to at least one of the components of the electronic device 100 of FIG. 1 or FIG. 2, and repetitive descriptions will hereinafter be omitted.

In an embodiment, the first support member 140 may be disposed inside the electronic device 100 and may be connected with the side bezel structure 118, or may be integrally formed with the side bezel structure 118. The first support member 140 may be formed of, for example, a metallic material and/or a nonmetallic (e.g., polymer) material. The display 130 may be coupled to, or located on, one surface of the first support member 140, and the printed circuit board 150 may be coupled to, or located on, an opposite surface of the first support member 140.

In an embodiment, a processor, memory, and/or an interface may be disposed on the printed circuit board 150. The processor may include, for example, one or more of a central processing unit, an application processor, a graphic processing unit, an image signal processor, a sensor hub processor, or a communication processor.

In an embodiment, the memory may include, for example, volatile memory or nonvolatile memory.

In an embodiment, the interface may include, for example, a high definition multimedia interface (HDMI), a universal serial bus (USB) interface, an SD card interface, and/or an audio interface. For example, the interface may electrically or physically connect the electronic device 100 with an external electronic device and may include a USB connector, an SD card/MMC connector, or an audio connector.

In an embodiment, the battery 152, which is a device for supplying power to at least one component of the electronic device 100, may include, for example, a primary cell that is not rechargeable, a secondary cell that is rechargeable, or a fuel cell. At least a portion of the battery 152, for example, may be disposed on substantially the same plane as the printed circuit board 150. The battery 152 may be integrally disposed inside the electronic device 100, or may be disposed to be detachable from the electronic device 100.

In an embodiment, the antenna 170 may be disposed between the back plate 180 and the battery 152. The antenna 170 may include, for example, a near field communication (NFC) antenna, a wireless charging antenna, and/or a magnetic secure transmission (MST) antenna. For example, the antenna 170 may perform short-range communication with an external device, or may wirelessly transmit and receive power required for charging. In an embodiment, an antenna structure may be formed by a portion of the side bezel structure 118 and/or a portion of the first support member 140, or a combination thereof.

In an embodiment, the first camera module 105 may be coupled to the rear surface of the display 130 to receive light through the camera area 106 of the front plate 120. For example, at least a portion of the first camera module 105 may be disposed on the first support member 140. For example, an image sensor of the first camera module 105 may receive light passing through the camera area 106 and a pixel array included in the display 130. For example, the camera area 106 may at least partially overlap the display area on which contents are displayed. For example, the optical axis OA of the first camera module 105 may pass through a partial area of the display 130 and the camera area 106 of the front plate 120. For example, the partial area may include a pixel array including a plurality of light emitting elements. In an embodiment, a partial area of the display 130 that faces the first camera module 105 may be formed to be a transmissive area that has a specified transmittance as a portion of the display area on which contents are displayed. In an embodiment, the transmissive area may be formed to have a transmittance of about 5% to about 25%. In an embodiment, the transmissive area may be formed to have a transmittance of about 25% to about 50%. In an embodiment, the transmissive area may be formed to have a transmittance of about 50% or more. The transmissive area may include an area overlapping an effective area (e.g., a field of view (FOV)) of the first camera module 105 through which light incident on the image sensor passes to generate an image. For example, the transmissive area of the display 130 may include an area having a lower pixel density and/or wiring density than a surrounding area.

In an embodiment, the second camera module 112 may be disposed such that a lens is exposed through the rear camera area 184 of the back plate 180 of the electronic device 100 (e.g., the rear surface 110B of FIG. 2). The rear camera area 184 may be formed in at least a portion of a surface of the back plate 180 (e.g., the rear surface 110B of FIG. 2). In an embodiment, the second camera area 184 may be formed to be at least partially transparent such that the second camera module 112 receives external light through the second camera area 184.

In an embodiment, at least a portion of the rear camera area 184 may protrude to a predetermined height from the surface of the back plate 180. However, without being necessarily limited thereto, the rear camera area 184 may form substantially the same plane as the surface of the back plate 180.

Figure 4:
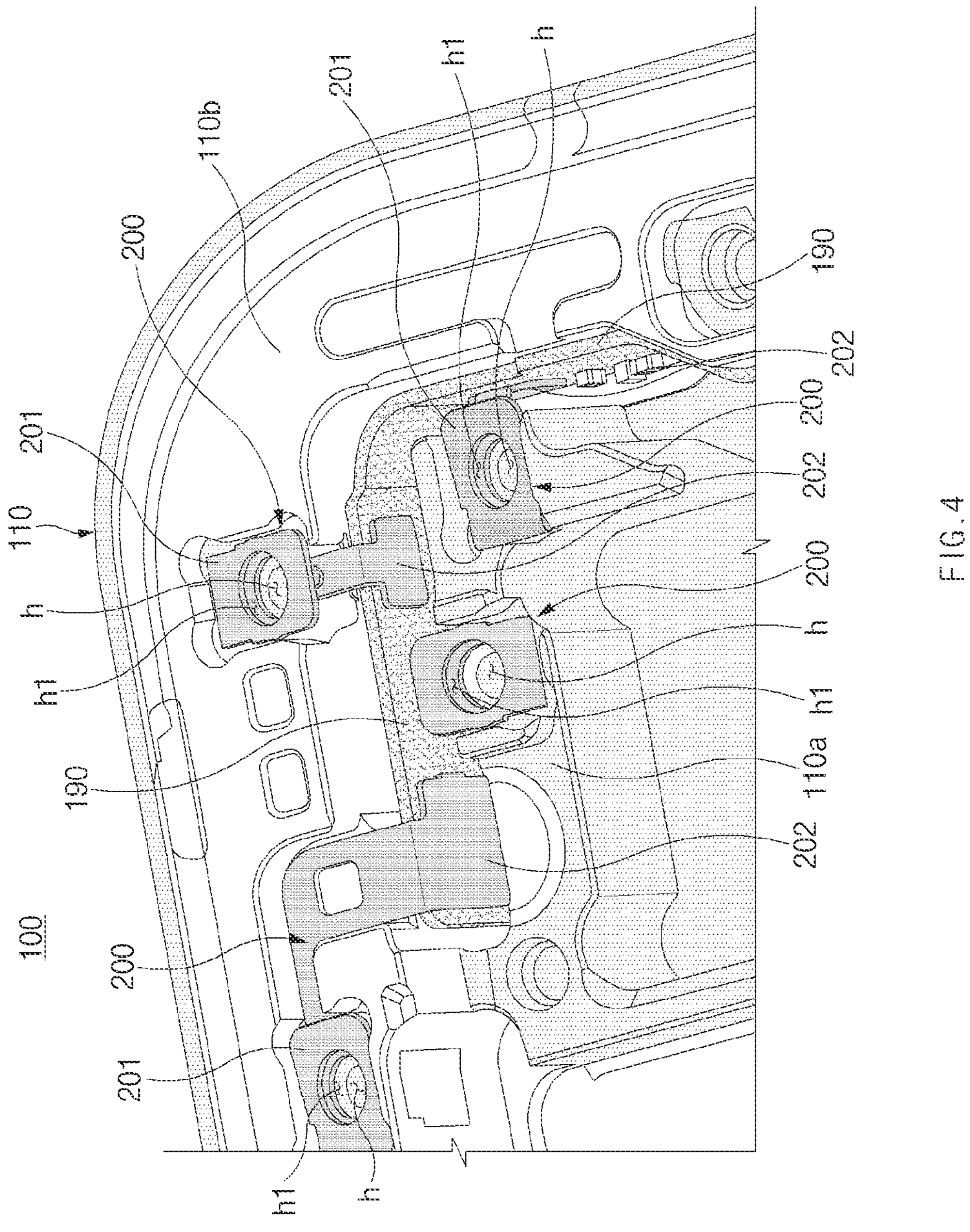
FIG. 4 is a partial perspective view illustrating the inside of the electronic device according to various embodiments.

FIG. 4 is a partial perspective view illustrating inside of the electronic device according to various embodiments.

Referring to FIG. 4, in an embodiment, the electronic device 100 may include the housing 110, a substrate 190, and a connector 200. The housing 110 may form an outer surface of the electronic device 100 (e.g., the side bezel structure 118 of FIG. 3) and an internal structure (e.g., the first support member 140 of FIG. 3). The housing 110 may include a metal portion 110*a* containing a metallic material and a polymer portion 110*b* containing a polymer material. The illustrated housing 110 may include the side bezel structure 118 and/or the first support member 140 illustrated in FIG. 3.

In an embodiment, the metal portion 110*a* of the housing 110 may function as a ground of the electronic device 100. For example, electrical connection to a ground of a printed circuit board (e.g., the printed circuit board 150 of FIG. 3) may be made through the metal portion 110*a* of the housing 110. For example, a ground signal may be applied to the metal portion 110*a* of the housing 110 through the substrate 190 and the connector 200.

In an embodiment, the housing 110 may function as an antenna. For example, the metal portion 110*a* of the housing 110 may include an antenna pattern. For example, the antenna pattern may include an electrically conductive pattern printed on the polymer portion 110*b*. The antenna pattern may be electrically insulated from the metal portion 110*a* by the polymer portion 110*b*. In another example, at least a portion of the metal portion 110*a* of the housing 110 may be configured as an antenna radiator. In another example, the antenna pattern and the metal portion 110*a* of the housing 110 may include an antenna radiator together. In this case, the antenna pattern and the metal portion 110*a* of the housing 110 may be directly or indirectly electrically connected with each other. A feed signal for transmitting and receiving a wireless signal may be applied to the antenna pattern and/or the metal portion 110*a* of the housing 110 through the connector 200.

In an embodiment, the connector 200 may be coupled to the housing 110. For example, the metal portion 110*a* and/or the polymer portion 110*b* of the housing 110 and the connector 200 may be coupled through a screw (e.g., a screw 281 of FIG. 6). For example, the screw may be configured to pass through the connector 200. The screw may be configured to pass through at least a portion of the metal portion 110*a* and/or the polymer portion 110*b* of the housing 110. For example, the metal portion 110*a* of the housing 110 may have a hole h formed therein into which the screw is inserted.

The substrate 190 may be disposed in the inner space of the housing 110. The substrate 190 may include at least one of a rigid substrate, a flexible substrate, or a rigid substrate including a partially flexible portion. In an embodiment, the substrate 190 may be electrically connected with a printed circuit board (e.g., the printed circuit board 150 of FIG. 3). For example, the substrate 190 may be electrically connected with a ground of the printed circuit board. The ground may include an electrically conductive layer provided by the printed circuit board. The electrically conductive layer may contain a material (e.g., copper) having electrical conductivity. The substrate 190 may be electrically connected with the metal portion 110*a* of the housing 110. For example, the substrate 190 may be electrically connected with the metal portion 110*a* of the housing 110 through the connector 200. The metal portion 110*a* of the housing 110 and the printed circuit board may be electrically connected through the substrate 190. An electrical signal may be transmitted between the printed circuit board and the metal portion 110*a* of the housing 110 through the above-described electrical path. For example, the electrical signal may include a feed signal for transmitting and receiving a ground signal and/or a wireless signal.

The connector 200 may contain an electrically conductive material and may support electrical connection. In an embodiment, the connector 200 may be configured such that one side is connected to the substrate 190 and an opposite side is connected to the metal portion 110*a* of the housing 110. For example, the one side of the connector 200 may be physically and electrically connected to the substrate 190, and the opposite side of the connector 200 may be physically and electrically connected to the metal portion 110*a* of the housing 110. The connector 200 may include a first connecting portion 201 connected to the metal portion 110*a* of the housing 110 and a second connecting portion 202 connected to the substrate 190. For example, the second connecting portion 202 may be surface-mounted on the substrate 190. The second connecting portion 202 may be soldered on an electrically conductive pad formed on the substrate 190. For example, the first connecting portion 201 may be connected to the metal portion 110*a* of the housing 110 through the screw fastened to the first connecting portion 201.

In an embodiment, the first connecting portion 201 of the connector 200 may include two areas facing each other and may include a first hole h1 penetrating the two areas. For example, the first hole h1 and the hole h formed in the metal portion 110*a* of the housing 110 may be at least partially aligned with each other in a fastening direction of the screw such that the screw passes through the first hole h1 and the hole h. In an embodiment, when the screw is coupled to the connector 200, one of the two areas facing each other may move toward and at least partially contact the other one of the two areas.

Figure 5A:
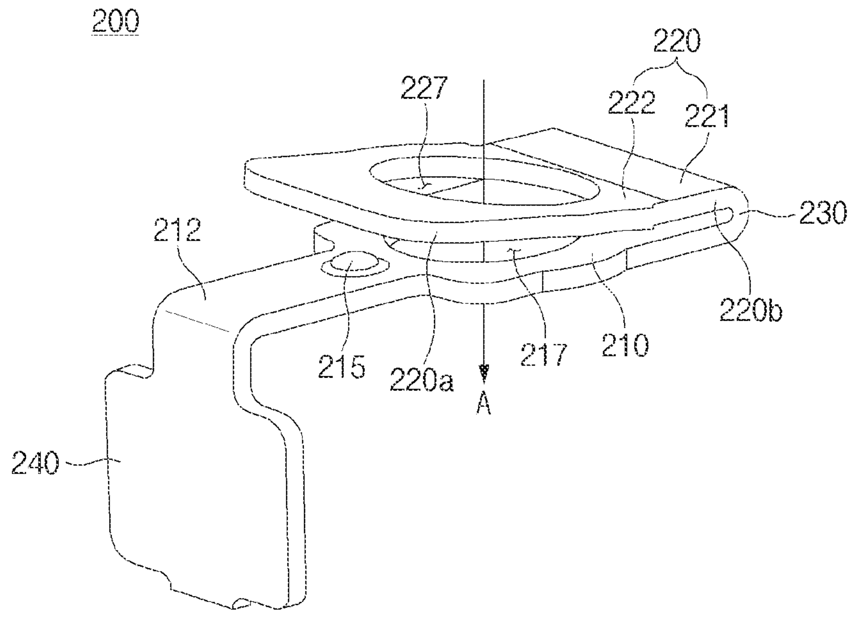
FIG. 5A is a perspective view illustrating a connector of the electronic device according to various embodiments.
Figure 5B:
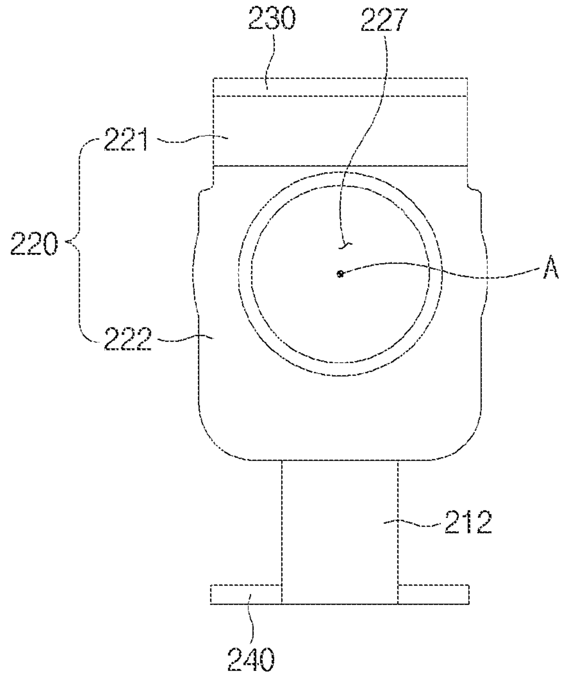
FIG. 5B is a diagram illustrating the connector of the electronic device according to various embodiments.
Figure 5C:
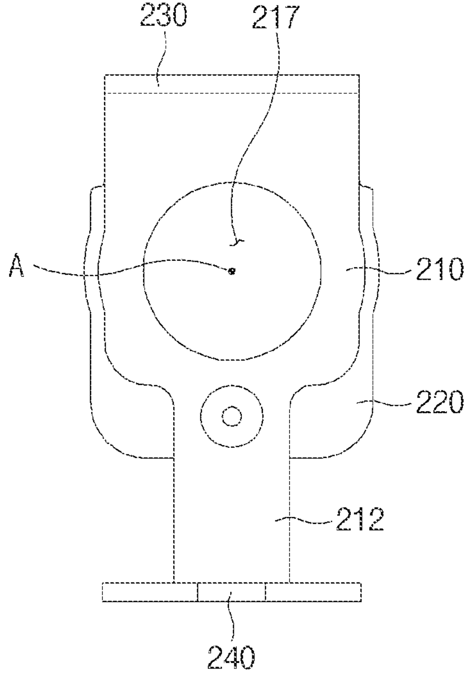
FIG. 5C is a diagram illustrating the connector of the electronic device according to various embodiments.

FIGS. 5A, 5B, and 5C are diagrams illustrating various views of the connector of the electronic device according to various embodiments. FIG. 5A is a perspective view of the connector, FIG. 5B is a diagram illustrating a top view of the connector, and FIG. 5C is a diagram illustrating a bottom view of the connector according to various embodiments.

Referring to FIGS. 5A, 5B, and 5C, the connector 200 may include a base portion 210, a movable portion 220, a bending portion 230, and a connecting portion 240.

In an embodiment, the base portion 210 may be located between the bending portion 230 and the connecting portion 240. The base portion 210 may be seated on the housing 110. For example, the base portion 210 may be seated to be at least partially contacted with a metal portion of the housing 110 (e.g., the metal portion 110*a* of FIG. 4). The base portion 210 may be fixedly coupled to the metal portion 110*a* through a screw (e.g., the screw 281 of FIG. 6). In an embodiment, the base portion 210 may be formed to be substantially flat. The base portion 210 may be configured to at least partially face the movable portion 220. For example, the base portion 210 and the movable portion 220 may at least partially overlap each other based on a penetration direction A of the screw. The base portion 210 may have a first hole 217 formed therein into which the screw is inserted. The first hole 217 may be at least partially aligned with a second hole 227, which is formed in the movable portion 220, in the penetration direction A of the screw. In an embodiment, at least one embossing 215 may be formed on the base portion 210. The embossing 215 may protrude toward the movable portion 220. The first hole 217 and the second hole 227 illustrated may be referred to as the first hole h1 illustrated in FIG. 4.

In an embodiment, the base portion 210 may further include an extending portion 212 further extending from a point adjacent to the embossing 215. Referring to FIG. 5A, the extending portion 212 may be partially bent and connected to the connecting portion 240. The extending portion 212 may include a curved surface. However, the shape of the extending portion 212 is not necessarily limited to the curved surface. For example, the extending portion 212 may be flat. In an embodiment, the extending portion 212 may have a smaller width than the base portion 210. The extending portion 212 may have a smaller width than the movable portion 220.

In an embodiment, the bending portion 230 may be located between the base portion 210 and the movable portion 230. The movable portion 220 may extend from the bending portion 230. The movable portion 220 may at least partially overlap the base portion 210 when viewed in the penetration direction A of the screw. The movable portion 220 may have the second hole 227 formed therein into which the screw is inserted. The second hole 227 may be at least partially aligned with the first hole 217 of the base portion 210 in the penetration direction A of the screw.

In an embodiment, the movable portion 220 may be formed such that the distance from the base portion 210 is increased farther away from the bending portion 230. For example, the movable portion 220 may include a first end portion 220*a* and a second end portion 220*b* adjacent to the bending portion 230 and located on the opposite side to the first end portion 220*a*. The first end portion 220*a* of the movable portion 220 may be defined further away from the bending portion 230 than the second end portion 220*b*, and the distance between the first end portion 220*a* and the base portion 210 may be greater than the distance between the second end portion 220*b* and the base portion 210. The distances may be distances measured in the penetration direction A of the screw. For example, the movable portion 220 may include a portion (e.g., a second movable portion 222) obliquely extending from the bending portion 230.

In an embodiment, the movable portion 220 may be configured to move toward or away from the base portion 210. For example, as the screw is inserted, a head of the screw (e.g., a head 282 of FIG. 6) may press the movable portion 220 toward the base portion 210. The movable portion 220 may at least partially contact the base portion 210. For example, the movable portion 220 may contact the embossing 215 of the base portion 210 in the state in which the screw is completely fastened. In an embodiment, at least a portion of the movable portion 220 may be plastically and elastically deformed when the screw is fastened.

In an embodiment, in the state in which the screw (e.g., the screw 281 of FIG. 6) is fastened, the movable portion 220 may be partially elastically deformed to provide an elastic force in the direction opposite to the fastening direction A of the screw 281 (e.g., the penetration direction of the screw). For example, even when the completely fastened screw 281 is partially loosened, the movable portion 220 may press the head 282 of the screw 281 by the elastic force, and electrical connection between the movable portion 220 and the screw may be maintained.

In an embodiment, the movable portion 220 may include a first movable portion 221 connected to the bending portion 230 and the second movable portion 222 obliquely extending from the first movable portion 221. For example, the first movable portion 221 may be defined between the second movable portion 222 and the bending portion 230. For example, the first movable portion 221 may be substantially parallel to the base portion 210. For example, the second movable portion 222 may obliquely extend such that the distance from the base portion 210 is increased farther away from the first movable portion 221.

In an embodiment, the bending portion 230 may be configured such that one side is connected to the base portion 210 and an opposite side is connected to the movable portion 220. The bending portion 230 may have a bent shape in which one portion faces another portion. When pressure is applied to the movable portion 220 (e.g., when the screw is fastened), at least a portion of the bending portion 230 may move toward the base portion 210 together with the movable portion 220. In an embodiment, at least a portion of the movable portion 220 may be plastically and elastically deformed when the screw is fastened.

In an embodiment, the connecting portion 240 may be connected to the extending portion 212 of the base portion 210. The connecting portion 240 may be referred to as the second connecting portion 202 of FIG. 4. The connecting portion 240 may include an area surface-mounted on a substrate (e.g., the substrate 190 of FIG. 4). For example, the connecting portion 240 may be soldered on an electrically conductive pad included in the substrate 190.

In an embodiment, the second movable portion 222 may be plastically and elastically deformed in the state in which the screw (e.g., the screw 281 of FIG. 6) is fastened. The elastic deformation of the second movable portion 222 may provide an elastic force in the direction opposite to the fastening direction A of the screw 281 (e.g., the penetration direction of the screw). For example, even when the completely fastened screw 281 is partially loosened, the second movable portion 222 may press the head of the screw 281 (e.g., the head 282 of FIG. 6) by the elastic force, and electrical connection between the second movable portion 222 and the screw 281 may be maintained.

Figure 6:
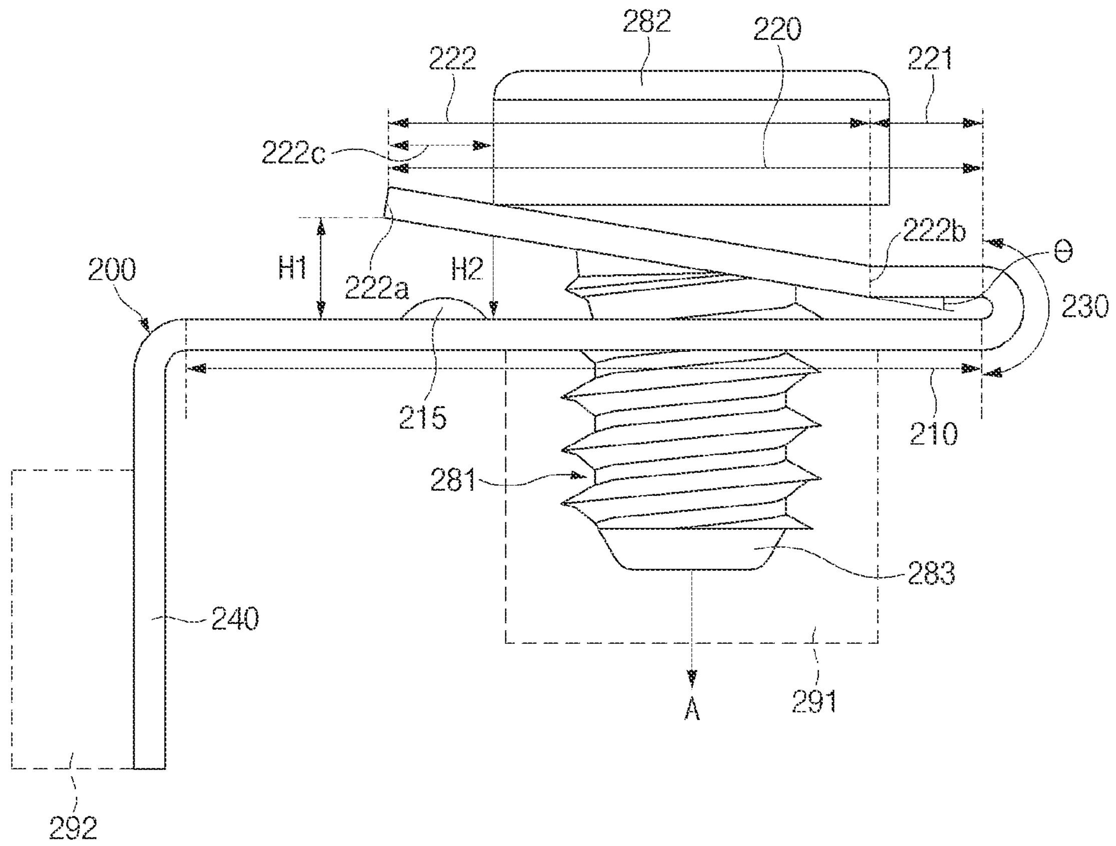
FIG. 6 is a diagram illustrating the connector of the electronic device including two movable portions according to various embodiments.
Figure 7:
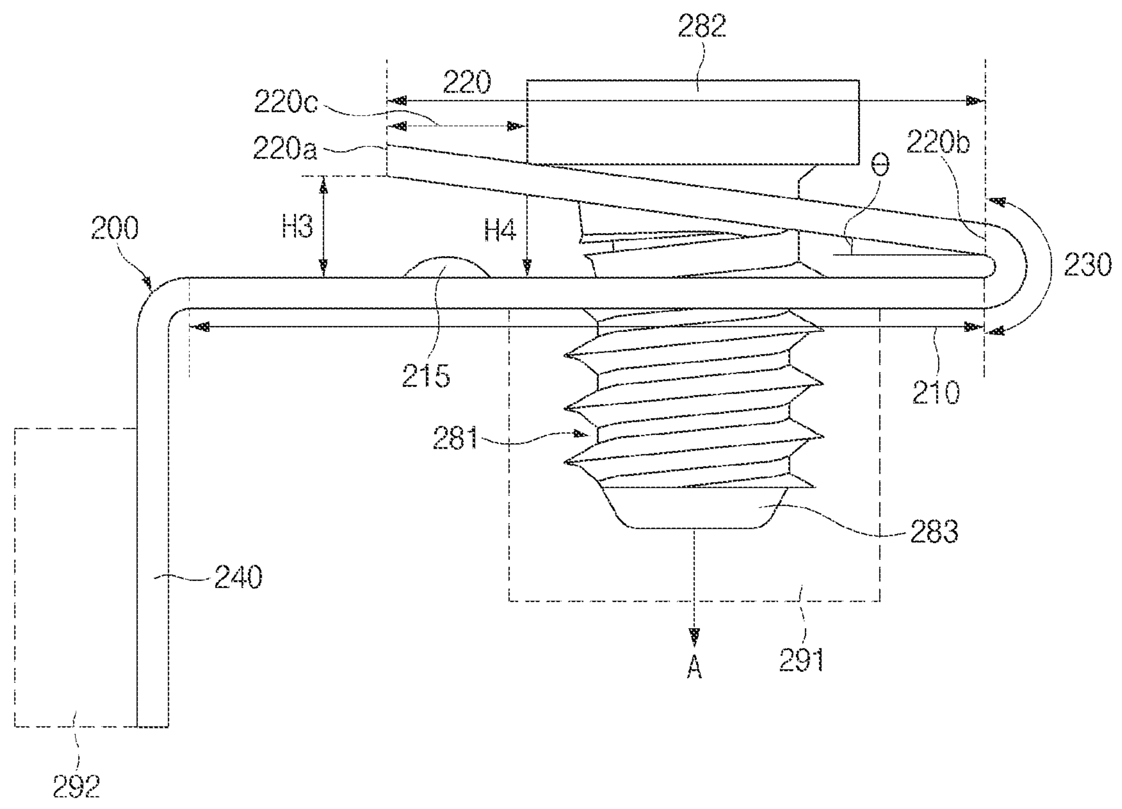
FIG. 7 is a diagram illustrating a connector of the electronic device including one movable portion according to various embodiments.
Figure 8A:
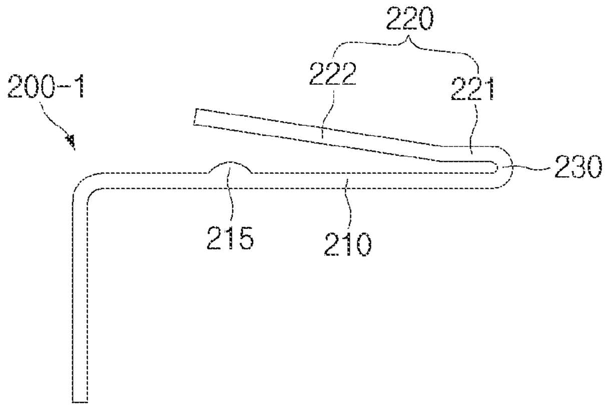
FIG. 8A includes diagrams illustrating deformation of the connector illustrated in FIG. 6 according to various embodiments.
Figure 8A:
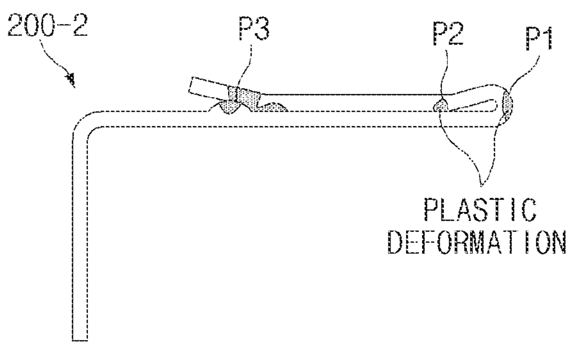
Figure 8A:
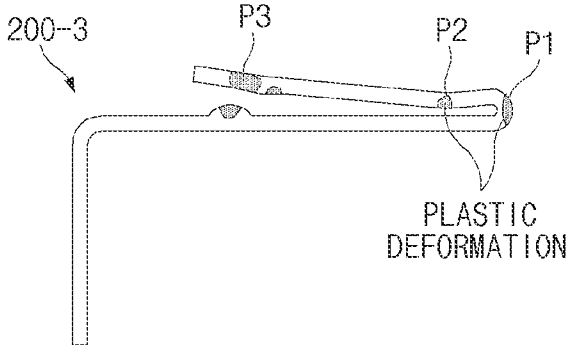
Figure 8B:
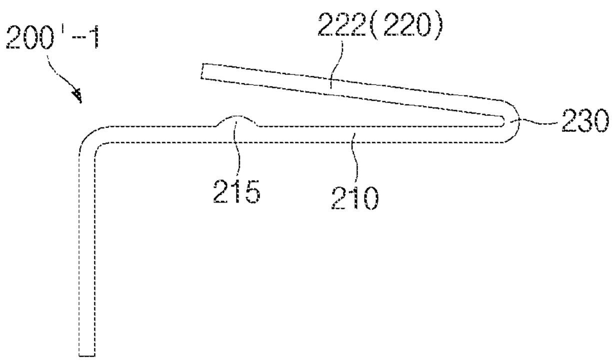
FIG. 8B includes diagrams illustrating deformation of the connector illustrated in FIG. 7 according to various embodiments.
Figure 8B:
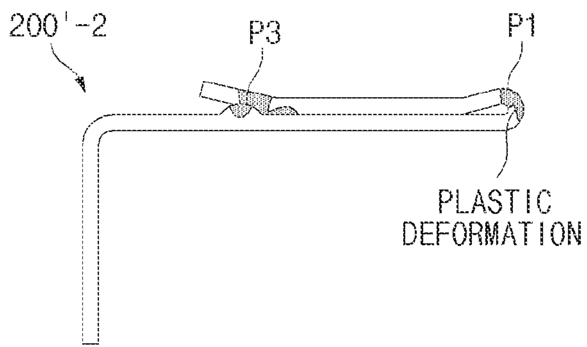
Figure 8B:
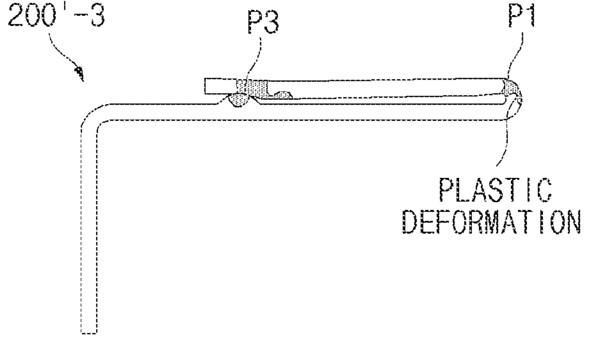

FIG. 6 is a diagram illustrating the connector of the electronic device including two movable portions according to various embodiments. FIG. 7 is a diagram illustrating a connector of the electronic device including one movable portion according to various embodiments. FIG. 8A includes diagrams illustrating deformation of the connector illustrated in FIG. 6 according to various embodiments. In FIG. 8A, reference numeral 200-1 indicates the connector before a screw is fastened, reference numeral 200-2 indicates the connector to which the screw is fastened, and reference numeral 200-3 indicates the connector from which the fastened screw is separated. FIG. 8B includes diagrams illustrating deformation of the connector illustrated in FIG. 7 according to various embodiments. In FIG. 8B, reference numeral 200'-1 indicates the connector before a screw is fastened, reference numeral 200'-2 indicates the connector to which the screw is fastened, and reference numeral 200'-3 indicates the connector from which the fastened screw is separated.

Referring to FIG. 6, the connector 200 may be electrically connected with a first electrically conductive structure 291 through the screw 281. For example, the connector 200 may be electrically connected with the first electrically conductive structure 291 by at least partially contacting the first electrically conductive structure 291. The connector 200 may be electrically connected with the first electrically conductive structure 291 by being coupled to the first electrically conductive structure 291 through the screw 281. For example, the first electrically conductive structure 291 may include the metal portion 110*a* of the housing 110 illustrated in FIG. 4. The screw 281 may include the head 282 and a threaded portion 283 extending from the head 282 and having threads formed thereon. The head 282 may have a larger cross-sectional area than the threaded portion 283. The threaded portion 283, while rotating, may pass through the movable portion 220 in the fastening direction A (e.g., the penetration direction of the screw) (e.g., through the second hole 227 of FIG. 5A), may pass through the base portion 210 (e.g., through the first hole 217 of FIG. 5A), and may pass through at least a portion of the first electrically conductive structure 291 (e.g., through the hole h of FIG. 4). In various embodiments, the threaded portion 283 may pass through the second movable portion 222.

The connector 200 may be electrically connected with a second electrically conductive structure 292 by at least partially contacting the second electrically conductive structure 292. The second electrically conductive structure 292 may include the substrate 190 illustrated in FIG. 4 or the printed circuit board 150 illustrated in FIG. 3. For example, the connecting portion 240 of the connector 200 may be surface-mounted on the second electrically conductive structure 292. Accordingly, the first electrically conductive structure 291 and the second electrically conductive structure 292 may be electrically connected through the fastening of the screw 281 to the connector 200.

In an embodiment, the second movable portion 222 may be provided such that the distance from the base portion 210 is increased farther away from the first movable portion 221. For example, the second end portion 222*b* of the second movable portion 222 may be connected with the first movable portion 221. The distance between the first end portion 222*a* of the second movable portion 222 and the base portion 210 may be defined as the maximum contact distance. For example, the maximum contact distance of the connector 200 illustrated in FIG. 6 may be a first height H1.

Referring to FIG. 6, an effective contact distance may be defined in the connector 200. For example, the effective contact distance may be greater than or equal to a second height H2. The effective contact distance may be smaller than or equal to the first height H1. The effective contact distance may refer to the distance by which the screw 281, when fastened, is inserted to the maximum from the state in which the head 282 of the screw 281 contacts the connector 200 to the state in which the screw 281 is completely fastened. For example, referring to FIG. 6, the head 282 of the screw 281 may press the second movable portion 222 by the second height H2. As the effective contact distance is increased, contact stability may be increased. For example, whether the screw 281 is completely fastened may be visually inspected in an assembly process of the electronic device 100. Accordingly, as the effective contact distance is increased, the height difference between the head 282 when the screw 281 is completely fastened and the head 282 when the screw 281 is incompletely fastened may appear to be large, and the incompletely fastened screw 281 may be easily detected in the visual inspection. In addition, as the effective contact distance is increased, the contact stability of a product passing the visual inspection may be increased, and thus the reliability of the visual inspection may be increased.

In an embodiment, the effective contact distance may vary depending on the angle θ formed by the first movable portion 221 and the second movable portion 222. For example, as the angle θ is increased, the effective contact distance may be increased, and as the angle θ is decreased, the effective contact distance may be decreased.

Referring to FIG. 7, in an embodiment, the distance between a movable portion 220 and a base portion 210 may be increased farther away from a bending portion 230. For example, a second end portion 220*b* of the movable portion 220 may be connected with the bending portion 230. The distance between a first end portion 220*a* of the movable portion 220 and the base portion 210 may be defined as the maximum contact distance. For example, the maximum contact distance of the connector 200 illustrated in FIG. 7 may be a third height H3. Referring to FIG. 7, an effective contact distance may be defined in the connector 200. For example, the effective contact distance may be greater than or equal to a fourth height H4. Furthermore, the effective contact distance may be smaller than or equal to the third height H3. For example, to completely fasten a screw 281, a head 282 of the screw 281 may press the movable portion 220 by the fourth height H4.

Referring to FIG. 7, in an embodiment, the effective contact distance may vary depending on the angle θ formed by the movable portion 220 and the bending portion 230. For example, as the angle θ is increased, the effective contact distance may be increased, and as the angle θ is decreased, the effective contact distance may be decreased.

The connectors 200 illustrated in FIGS. 6 and 7 may include the movable portions 220 facing the base portions 210 and obliquely extending from the bending portions 230 and thus may provide the effective contact distances H2 and H4 having sufficient magnitudes appropriate for a visual inspection.

However, as the angles θ illustrated in FIGS. 6 and 7 are increased, stresses applied to the movable portions 220 when the screws 281 are fastened may be increased, which may cause relatively large plastic deformations.

In various embodiments, in FIGS. 6 and 7, the second electrically conductive structures 292 are illustrated as contacting side surfaces (e.g., the left side surfaces) of the connecting portions 240. However, without being necessarily limited thereto, the second electrically conductive structures 292 may contact the opposite side surfaces (e.g., the right side surfaces) of the connecting portions 240.

Referring to FIG. 6, as the screw 281 is fastened, the head 282 of the screw 281 may press the second movable portion 222 such that the second movable portion 222 moves toward the base portion 210. Accordingly, the first movable portion 221, the second movable portion 222, and the bending portion 230 may be deformed. For example, the deformation of each of the portions may include elastic deformation and plastic deformation. In the state in which the screw 281 is completely fastened, the first movable portion 221 and the second movable portion 222 may contact the base portion 210, and the second movable portion 222 may contact the embossing 215.

Referring to FIG. 7, as the screw 281 is fastened, the head 282 of the screw 281 may press the movable portion 220 such that the movable portion 220 moves toward the base portion 210. Accordingly, the movable portion 220 and the bending portion 230 may be deformed. For example, the deformation of each of the portions may include elastic deformation and plastic deformation. In the state in which the screw 281 is completely fastened, the movable portion 220 may contact with the base portion 210 and may partially contact the embossing 215.

In an embodiment, the connector 200 may be partially plastically deformed as the screw 281 is fastened. For example, when the screw 281 is separated from the connector 200, the connector 200 may have a portion that is deformed without returning to the original state. For example, referring to FIG. 6, in the state in which the screw 281 is separated after fastened, the first movable portion 221 and the second movable portion 222 may be closer to the base portion 210 than in the state in which the screw 281 is not fastened. For example, referring to FIG. 7, in the state in which the screw 281 is separated after fastened, the movable portion 220 may be closer to the base portion 210 than in the state in which the screw 281 is not fastened. That is, when the fastened screw 281 is separated, the maximum contact distance H3 and the effective contact distance may be decreased, and when the screw 281 is assembled again, a sufficient effective contact distance may not be provided. Accordingly, when the connector 200 undergoes relatively small plastic deformation, the connector 200 may be easy to reassemble.

Furthermore, there is a trade-off relationship between plastic deformation and elastic deformation, and small plastic deformation may refer, for example, to relatively large elastic deformation. As described above, elastic deformation of the second movable portion 222 or the movable portion 220 may provide an elastic force to press the head 282 of the screw 281 in the direction opposite to the fastening direction A of the screw 281, and the elastic force may stably maintain electrical connection between the screw 281 and the connector 200 even when the screw 281 is partially loosened. In other words, as elastic deformation of the second movable portion 222 or the movable portion 220 is increased (as plastic deformation is decreased), the reliability of the connector 200 may be improved.

Referring to FIG. 8A together, the connector 200 illustrated in FIG. 6 may include the first movable portion 221 and the second movable portion 222 obliquely extending from the first movable portion 221, and thus deformation of the connector 200 depending on fastening the screw 281 may be distributed. For example, the deformation of the connector 200 may mainly occur at a first point P1 at which the bending portion 230 and the first movable portion 221 are connected and a second point P2 at which the first movable portion 221 and the second movable portion 222 are connected. Stresses distributedly acting on the two points P1 and P2 may provide smaller plastic deformation than stress intensively acting on one point.

For example, referring to FIG. 8B, in the case of the connector 200 illustrated in FIG. 7, plastic deformation may mainly and intensively occur at one point P1 at which the bending portion 230 and the movable portion 220 are connected. The connector 200 illustrated in FIG. 7 may undergo smaller elastic deformation and larger plastic deformation than the connector 200 illustrated in FIG. 6.

The connector 200 illustrated in FIG. 6 may have a smaller amount of plastic deformation than the connector 200 illustrated in FIG. 7 and thus may provide relatively improved reassembly performance. In other words, it may be understood that distributed stress slightly high relative to critical stress of elastic deformation acts on the connector 200 of FIG. 6 and concentrated stress significantly high relative to critical stress of elastic deformation acts on the connector 200 of FIG. 7.

The connectors 200 illustrated in FIGS. 6 and 7 may include the embossing 215 provided on the base portions 210, and plastic deformations of the connectors 200 depending on fastening the screws 281 may be decreased by the embossing 215. For example, the second movable portion 222 of FIG. 6 may include a first portion 222*c*. The first portion 222*c* may include the first end portion 222*a* and may not overlap the head 282 of the screw 281. The movable portion 220 of FIG. 7 may include a first portion 220*c*. The first portion 220*c* may include the first end portion 220*a* and may not overlap the head 282 of the screw 281. When viewed in the penetration direction A of FIG. 7, the head 282 and/or the threaded portion 283 of the screw 281 may be located between the first portion 220*c* of the movable portion 220 and the bending portion 230. In an embodiment, the first portions 222*c* and 220*c* may undergo relatively small plastic deformations due to the embossing 215. For example, when the embossing 215 do not exist, the first portions 222*c* and 220*c* may be substantially displaced by the effective contact distances H2 and H4 as the screws are fastened and may be plastically deformed. As the connectors 200 include the embossing 215 contacted with the first portions 222*c* and 220*c* (e.g., third points P3), plastic deformations of the movable portions 220 and the bending portions 230 (e.g., the first point P1 and the second point P2) may be decreased, and elastic deformations thereof may be increased.

Table 1 below shows a first effective contact distance before a screw is fastened, a second effective contact distance after the screw is separated, an amount of plastic deformation, and an effective contact distance recovery ratio, depending on the length of the first movable portion 221 of FIG. 6. In Table 1 below, the first effective contact distance and the second effective contact distance are based on a screw having a diameter of 1.85 mm

TABLE 1

| Length [mm] | 0.450 | 0.550 | 0.650 | 0.750 |
|---|---|---|---|---|
| First Effective Contact Distance [mm] | 0.357 | 0.354 | 0.355 | 0.356 |
| Second Effective Contact Distance [mm] | 0.167 | 0.266 | 0.322 | 0.356 |
| Amount of Plastic Deformation (First Effective Contact Distance − Second Effective Contact Distance) | 0.190 | 0.088 | 0.033 | 0.000 |

TABLE 1-continued

| | | | | |
|---|---|---|---|---|
| Effective Contact Distance Recovery Ratio (Second Effective Contact Distance/First Effective Contact Distance) | 47% | 75% | 91% | 100% |

Referring to Table 1 above, as the length of the first movable portion 221 is increased, the amount of plastic deformation may be decreased, and the effective contact distance recovery ratio may be increased. Accordingly, the reassembly performance of the connector 200 may be improved. For example, when the length of the first movable portion 221 is 0.75 mm or more, the effective contact distance recovery ratio may be 100%.

Figure 9:
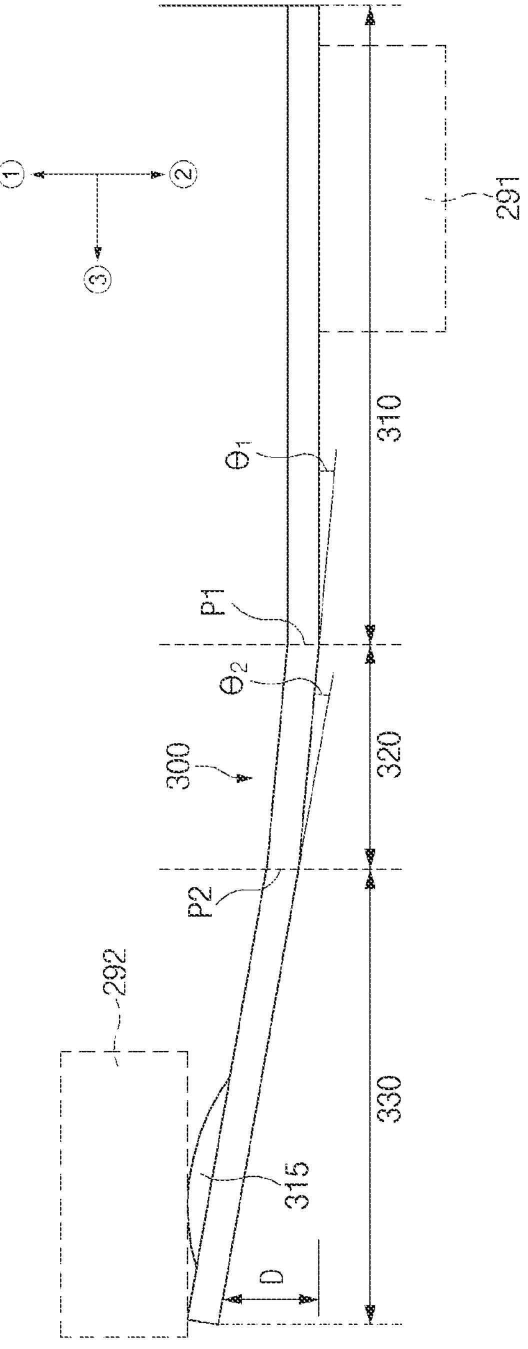
FIG. 9 is a diagram illustrating a connector of the electronic device according to various embodiments.

FIG. 9 is a diagram illustrating a connector of the electronic device according to various embodiments.

Referring to FIG. 9, the connector 300 may include a base portion 310, a first movable portion 320, and a second movable portion 330. The connector 300 may electrically connect a first electrically conductive structure 291 and a second electrically conductive structure 292.

In an embodiment, the base portion 310 may be at least partially coupled to the first electrically conductive structure 291. For example, the base portion 310 may be soldered (e.g., surface-mounted) on the first electrically conductive structure 291. In various embodiments, the base portion 310 may be referred to as the second connecting portion 202 of FIG. 4. In an embodiment, the first electrically conductive structure 291 may include the substrate 190 of FIG. 4 or the metal portion 110*a* of the housing 110 of FIG. 4, and the second electrically conductive structure 292 may include the metal portion 110*a* of the housing 110 of FIG. 4 or the substrate 190 of FIG. 4. However, without being limited thereto, the first electrically conductive structure 291 and the second electrically conductive structure 292 may include various components requiring electrical connection.

In an embodiment, the first movable portion 320 may obliquely extend from the base portion 310 at a first angle $\theta_1$. The second movable portion 330 may obliquely extend from the first movable portion 320 at a second angle $\theta_2$. The second movable portion 330 may be inclined with respect to the base portion 310 by a third angle $(\theta_1+\theta_2)$.

In an embodiment, the first movable portion 320 and the second movable portion 330 may be inclined such that the distance D from a reference line (e.g., a virtual line extending from the base portion 310) is increased farther away from the base portion 310.

Referring to FIG. 9, the second movable portion 330 may be at least partially coupled to the second electrically conductive structure 292. The second movable portion 330 may provide an elastic force toward the second electrically conductive structure 292. For example, the second movable portion 330 may be disposed in a state of being compressed by the second electrically conductive structure 292.

Referring to FIG. 9, an embossing 315 protruding toward the second electrically conductive structure 292 may be formed on the second movable portion 330. The embossing 315 may protrude in the direction in which the second movable portion 330 is inclined. The embossing 315 may be electrically connected with the second electrically conductive structure 292 by at least partially contacting the second electrically conductive structure 292.

In an embodiment, the first movable portion 320 and the second movable portion 330 may extend to be inclined in a first direction ① (e.g., upward based on the drawing) when viewed in a third direction ③ away from the base portion 310 (e.g., leftward based on the drawing). In an embodiment, the embossing 315 may substantially protrude in the first direction ① In an embodiment, the second movable portion 330 may be compressed by the second electrically conductive structure 292 and may provide an elastic force in the first direction ① to press the second electrically conductive structure 292. In an embodiment, at least a portion of the second electrically conductive structure 292 may be located in the first direction ① with respect to the second movable portion 330. For example, the second electrically conductive structure 292 may contact the upper surface of the second movable portion 330 and/or the embossing 315.

In an embodiment, the first electrically conductive structure 291 may be located in the first direction ① with respect to the base portion 310, or may be located in a second direction ② opposite to the first direction ① with respect to the base portion 310. For example, the first electrically conductive structure 291 may contact the upper surface or the lower surface of the base portion 310.

In an embodiment, distributed stresses may act on a first point P1 at which the first movable portion 320 and the base portion 310 of the connector 300 are connected and a second point P2 at which the first movable portion 320 and the second movable portion 330 are connected. When the distributed stresses act on the two points, small plastic deformation may be provided, as compared with when concentrated stress acts on one point. In addition, due to the embossing 315, the stresses acting on the first point P1 and the second point P2 may be distributed. Accordingly, the connector 300 illustrated in FIG. 9 may provide improved reassembly performance.

An electronic device according to an example embodiment of the disclosure may include: a housing including a metal portion and a polymer portion, a substrate disposed in the housing, a connector disposed in the housing and electrically connecting the metal portion and the substrate, and a screw fastening the metal portion of the housing and the connector and passing through the connector and at least a portion of the metal portion. The connector may include a base portion seated on the metal portion and through which the screw is configured to pass, a movable portion that at least partially faces the base portion and through which the screw is configured to pass, a bending portion connecting one side of the base portion and the movable portion, and a connecting portion extending from an opposite side of the base portion and connected to the substrate.

In various example embodiments, the movable portion may include a first movable portion connected to the bending portion and a second movable portion obliquely extending from the first movable portion at a specified angle.

In various example embodiments, each of the first movable portion and the second movable portion may at least partially overlap the base portion when viewed in a penetration direction of the screw.

In various example embodiments, each of the first movable portion and the second movable portion may at least partially contact the base portion in a state in which the screw is completely fastened.

In various example embodiments, the screw may pass through the second movable portion.

In various example embodiments, the second movable portion may be configured such that a distance from the base portion increases farther away from the first movable portion.

In various example embodiments, the specified angle may be greater than 0 degrees.

In various example embodiments, the first movable portion may be substantially parallel to the base portion.

In various example embodiments, an embossing protruding toward the second movable portion to contact the second movable portion may be formed on the base portion.

In various example embodiments, the base portion may include an extending portion extending to the connecting portion from an area where the embossing is formed, and the extending portion may have a width smaller width than a width of the base portion.

In various example embodiments, the connecting portion may face a different direction from the base portion, and the extending portion may be at least partially bent.

In various example embodiments, the movable portion may be configured to be inclined such that a distance from the base portion increases farther away from the bending portion.

In various example embodiments, a head of the screw may press the movable portion such that the movable portion at least partially contacts the base portion, and the movable portion may be configured to press the head of the screw in a direction opposite to a penetration direction of the screw.

In various example embodiments, the base portion may include an embossing protruding toward the movable portion, and the movable portion may at least partially contact the embossing in a state in which the screw is completely fastened.

In various example embodiments, the connecting portion may be electrically connected to a ground area of the substrate.

In various example embodiments, the connecting portion may be soldered to a ground pad located on a surface of the substrate.

In various example embodiments, a first hole may be formed in the base portion, and a second hole may be formed in the movable portion and at least partially aligned with the first hole in an insertion direction of the screw.

Figure 10A:
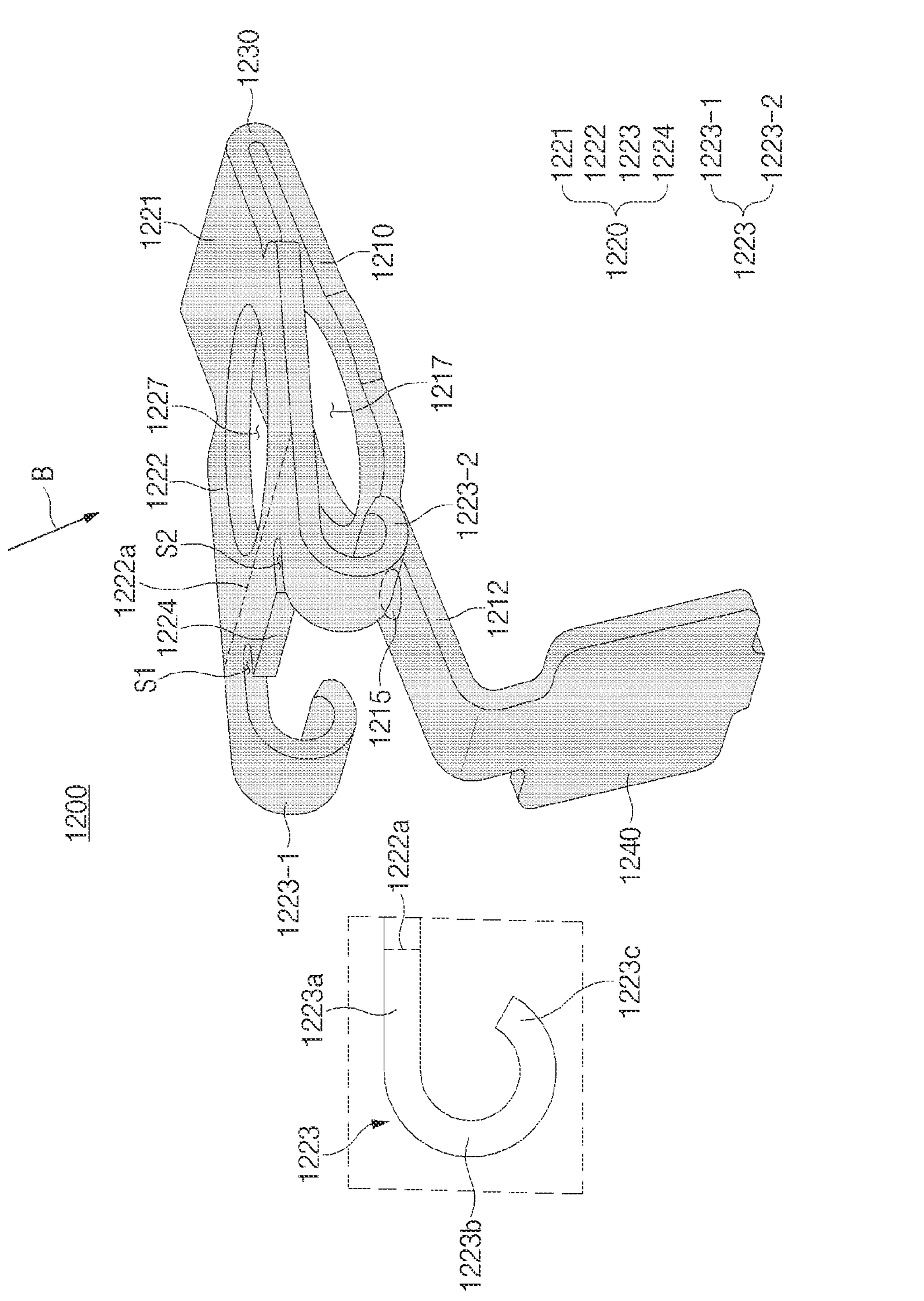
FIG. 10A is a perspective view illustrating a connector according to various embodiments.
Figure 10B:
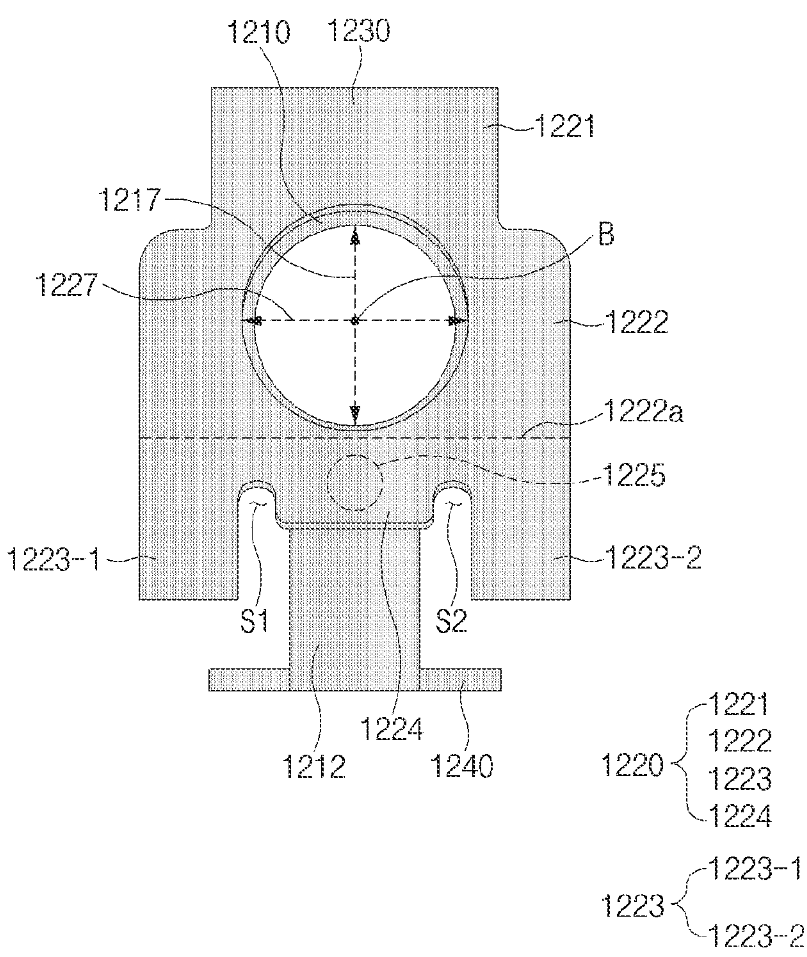
FIG. 10B is a diagram illustrating a top view of the connector according to various embodiments.
Figure 10C:
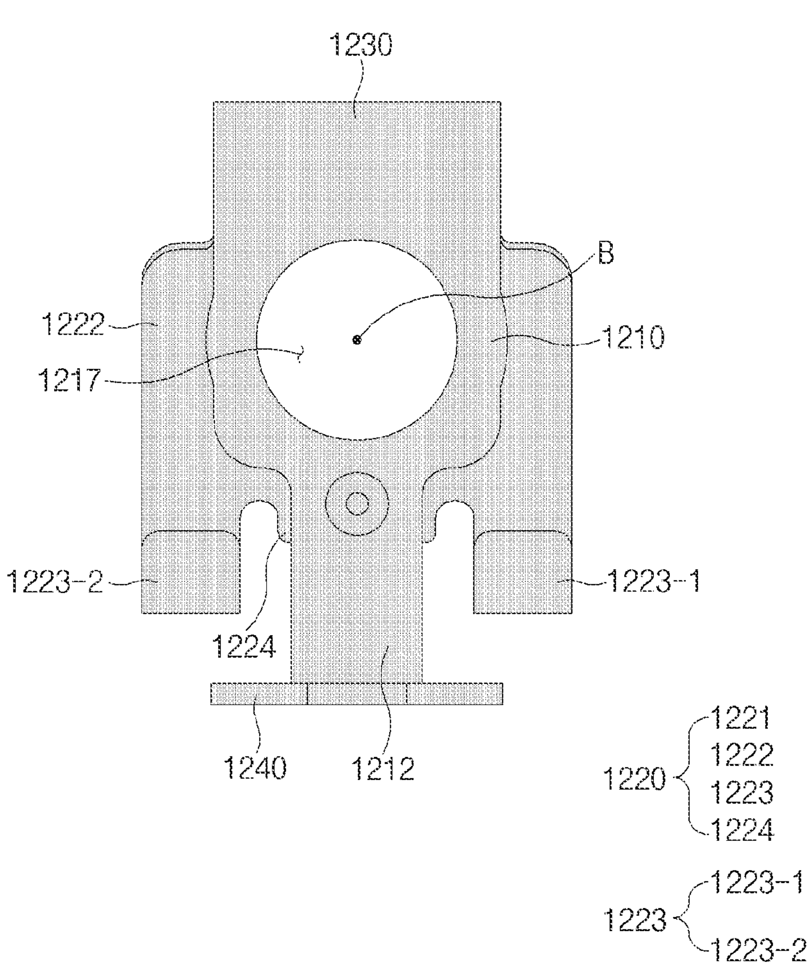
FIG. 10C is a diagram illustrating a bottom view of the connector according to various embodiments.
Figure 10D:
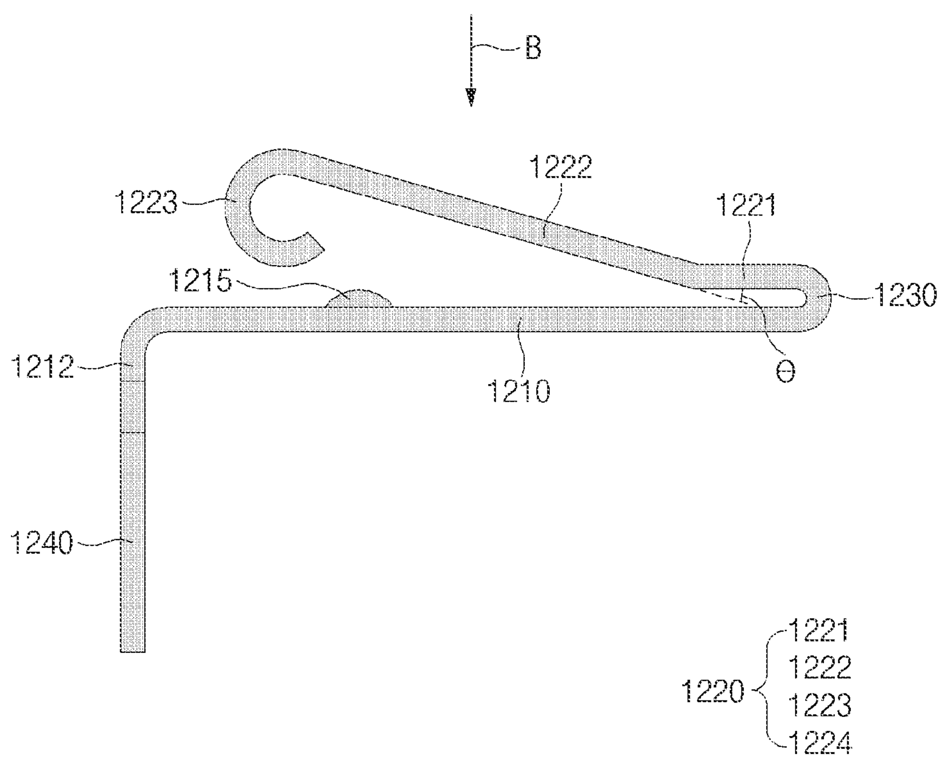
FIG. 10D is a diagram illustrating a side view of the connector according to various embodiments.

FIG. 10A is a perspective view illustrating a connector according to various embodiments. FIG. 10B is a diagram illustrating a top view of the connector according to various embodiments. FIG. 10B may be a view of the connector of FIG. 10A as viewed in a direction B. FIG. 10C is a diagram illustrating a bottom view of the connector according to various embodiments. FIG. 10C may be a view of the connector of FIG. 10A as viewed in the direction opposite to the direction B. FIG. 10D is a diagram illustrating a side view of the connector according to various embodiments. FIG. 10D may be a view of the connector of FIG. 10A as viewed in a direction perpendicular to the direction B. The direction B may be a direction substantially perpendicular to a base portion 1210 having a substantially plate shape. Furthermore, the direction B may be a direction (e.g., the penetration direction A of FIG. 6) in which a screw (e.g., the screw 281 of FIG. 6) passes through a first hole 1217 formed in the base portion 1210.

Referring to FIGS. 10A, 10B, 10C, and 10D, the connector 1200 according to an embodiment may include the base portion 1210, an extending portion 1212, a connecting portion 1240, a bending portion 1230, an embossing 1215, and a movable portion 1220. The descriptions provided with reference to the base portion 210, the extending portion 212, the connecting portion 240, the embossing 215, and the bending portion 230 of the connector 200 may be substantially identically, similarly, or correspondingly applied to the base portion 1210, the extending portion 1212, the connecting portion 1240, the embossing 1215, and the bending portion 1230. Furthermore, the descriptions provided with reference to the movable portion 220 (e.g., the first movable portion 221 and the second movable portion 222) may be substantially identically, similarly, or correspondingly applied to the movable portion 1220 (e.g., a first movable portion 1221 and a second movable portion 1222).

The movable portion 1220 may extend from the bending portion 1230. For example, the movable portion 1220 may extend from an end portion of the bending portion 1230 toward the embossing 1215. The movable portion 1220 may at least partially overlap the base portion 1210 when viewed in the direction B. The movable portion 1220 may have a second hole 1227 formed therein into which the screw is inserted. The second hole 1227 may be at least partially aligned with the first hole 1217 of the base portion 1210 based on the direction B. For example, as illustrated in FIG. 10B, the first hole 1217 and the second hole 1227 may at least partially overlap each other based on the direction B. The first hole 1217 and the second hole 1227 may form circles having substantially the same center, but are not limited thereto. To easily insert the screw into the first hole 1217 and the second hole 1227 located to be inclined with respect to each other, the second hole 1227 may have a larger diameter than the first hole 1217, but is not limited thereto.

The movable portion 1220 may include the first movable portion 1221, the second movable portion 1222, a third movable portion 1223, and a fourth movable portion 1224. The first movable portion 1221 may be located between the bending portion 1230 and the second movable portion 1222. The first movable portion 1221 may extend from the bending portion 1230 to the second movable portion 1222. The second movable portion 1222 may extend from the first movable portion 1221. The first movable portion 1221 may be formed to be substantially flat. The second movable portion 1222 may be formed to be substantially flat. The first movable portion 1221 may be substantially parallel to the base portion 1210, but is not limited thereto.

The second movable portion 1222 may obliquely extend from the first movable portion 1221. For example, as illustrated in FIG. 10D, the second movable portion 1222 may be inclined with respect to the first movable portion 1221 by an angle θ. The second movable portion 1222 may extend from the first movable portion 1221 so as to be gradually spaced farther away from the base portion 1210. The distance between the second movable portion 1222 and the base portion 1210 may be gradually increased as the second movable portion 1222 gets farther away from the bending portion 1230. The distance may be a distance measured based on the direction B. The first movable portion 1221 and the second movable portion 1222 may at least partially face the base portion 1210. The first movable portion 1221 and the second movable portion 1222 may at least partially overlap the base portion 1210 based on the direction B. The second movable portion 1222 may have a larger width than the first movable portion 1221, but is not limited thereto.

The third movable portion 1223 and the fourth movable portion 1224 may extend from the second movable portion 1222. For example, the third movable portion 1223 and the fourth movable portion 1224 may extend from a first end portion **1222*a* of the second movable portion 1222 (e.g., the first end portion 222*a* of FIG. 6). The third movable portion 1223 may include a pair of segments, and the fourth movable portion 1224 may be located therebetween. For example, the third movable portion 1223 may include a pair of segments 1223-1 and 1223-2 that are spaced apart from each other and that extend from the second movable portion 1222. The fourth movable portion 1224 may be located between the pair of segments 1223-1 and 1223-2. The fourth movable portion 1224 may be at least partially spaced apart from the third movable portion 1223. For example, the fourth movable portion 1224 may be at least partially spaced apart from the segment 1223-1 of the third movable portion 1223, and a first slit S1 may be defined therebetween. Furthermore, the fourth movable portion 1224 may be at least partially spaced apart from the segment 1223-2 of the third movable portion 1223, and a second slit S2** may be defined therebetween.

When the connector 1200 is viewed from above (e.g., when viewed in the direction B), the extending portion 1212 may be located between the pair of segments 1223-1 and 1223-2 of the third movable portion 1223.

The third movable portion 1223 may be configured to provide an elastic force to a component (e.g., the housing 110 of FIG. 11A) contacted with the third movable portion 1223. For example, the third movable portion 1223 may include a first portion 1223*a*, a second portion 1223*b*, and a third portion 1223*c*. The first portion 1223*a* may extend from the first end portion 1222*a* of the second movable portion 1222. The first portion 1223*a* may extend from the second movable portion 1222 so as to be substantially flat. The first portion 1223*a* may be substantially parallel to the fourth movable portion 1224. The first portion 1223*a* may at least partially overlap the fourth movable portion 1224 when viewed in the direction perpendicular to the direction B. The second portion 1223*b* may be defined between the first portion 1223*a* and the third portion 1223*c*. The second portion 1223*b* may extend from the first portion 1223*a*. The second portion 1223*b* may include a curved portion. For example, the second portion 1223*b* may have a shape curved from the first portion 1223*a* toward the base portion 1210. In another example, the second portion 1223*b* may extend from the first portion 1223*a* such that in a lower place than the first portion 1223*a*, the second portion 1223*b* at least partially faces the first portion 1223*a*. The third portion 1223*c* may extend from the second portion 1223*b*. The third portion 1223*c* may be located in a lower position than the first portion 1223*a* and the second movable portion 1222. The third portion 1223*c* may face toward the first portion 1223*a* and/or the second movable portion 1222. The second portion 1223*b* may include a portion curved such that the third portion 1223*c* faces toward the first portion 1223*a* and/or the second movable portion 1222. However, the descriptions of the first portion 1223*a*, the second portion 1223*b*, and the third portion 1223*c* of the third movable portion 1223 are illustrative, and various design changes can be made to the configuration and structure for providing an elastic force by the third movable portion 1223.

The fourth movable portion 1224 may overlap the base portion 1210 and/or the extending portion 1212. For example, the fourth movable portion 1224 may overlap the base portion 1210 and/or the extending portion 1212 based on the direction B. Furthermore, the fourth movable portion 1224 may overlap the embossing 1215 formed on the base portion 1210 and/or the extending portion 1212. For example, at least a portion of the fourth movable portion 1224 may overlap the embossing 1215 based on the direction B. The fourth movable portion 1224 may be deformed by contacting the embossing 1215 as the screw is fastened.

Figure 11A:
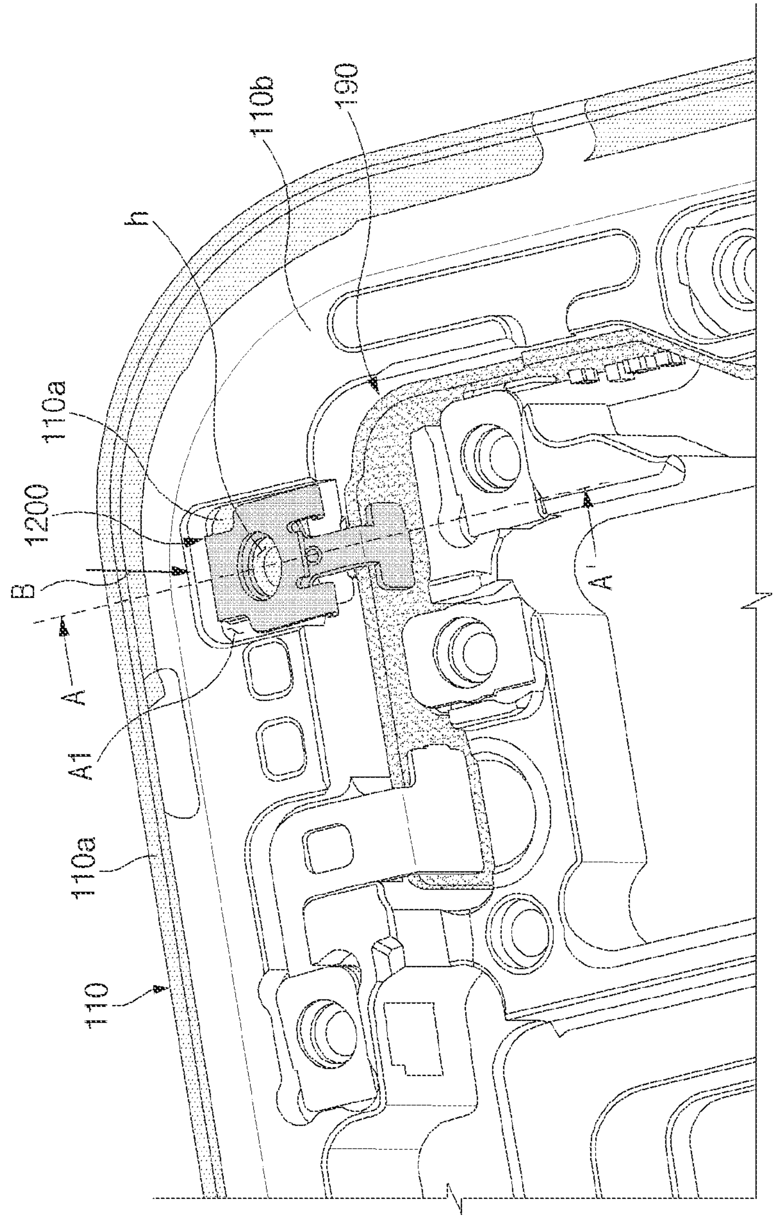
FIG. 11A is a partial perspective view illustrating the connector seated on a housing according to various embodiments.
Figure 11B:
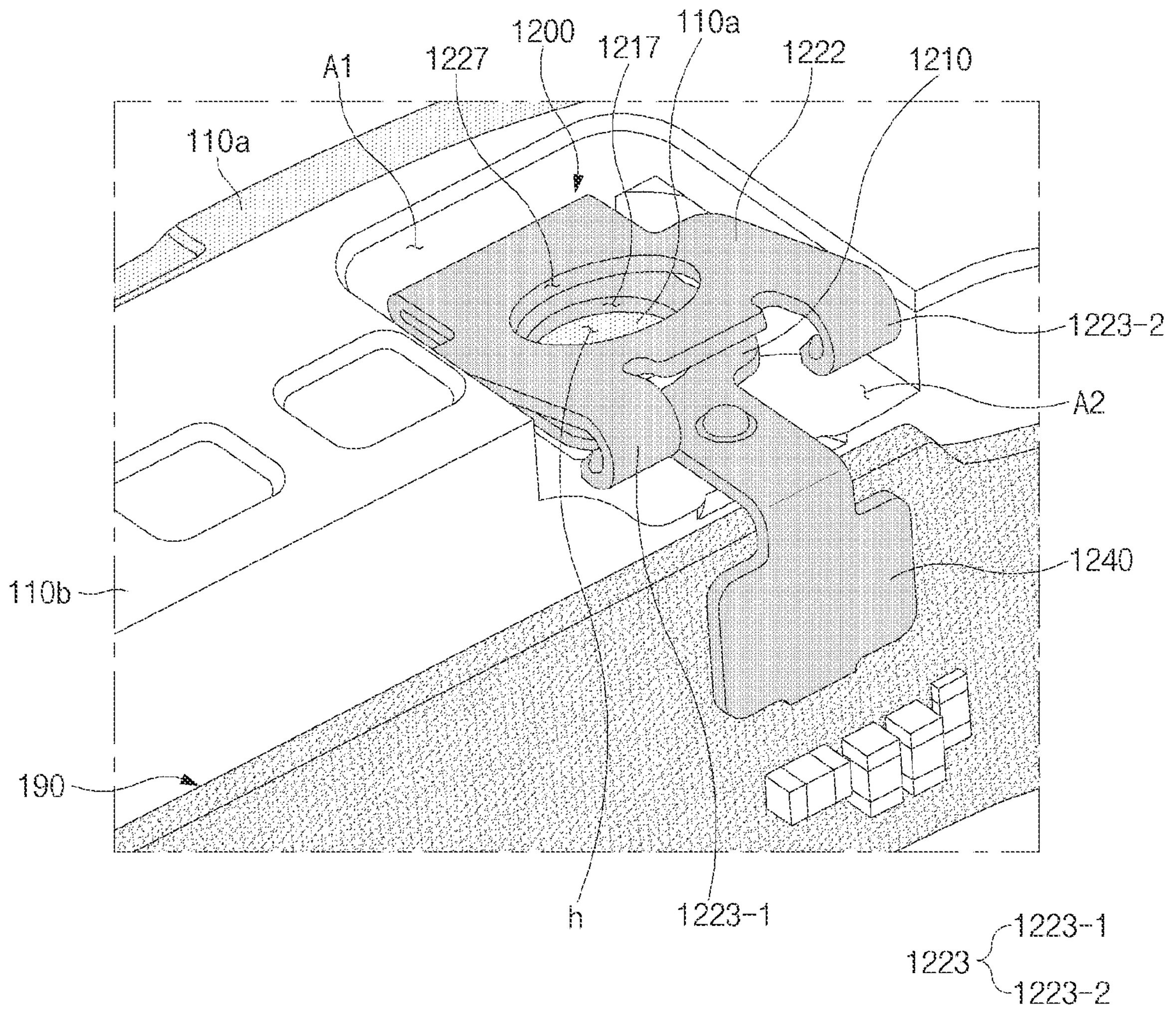
FIG. 11B is a partial perspective view illustrating the connector seated on the housing according to various embodiments.
Figure 11C:
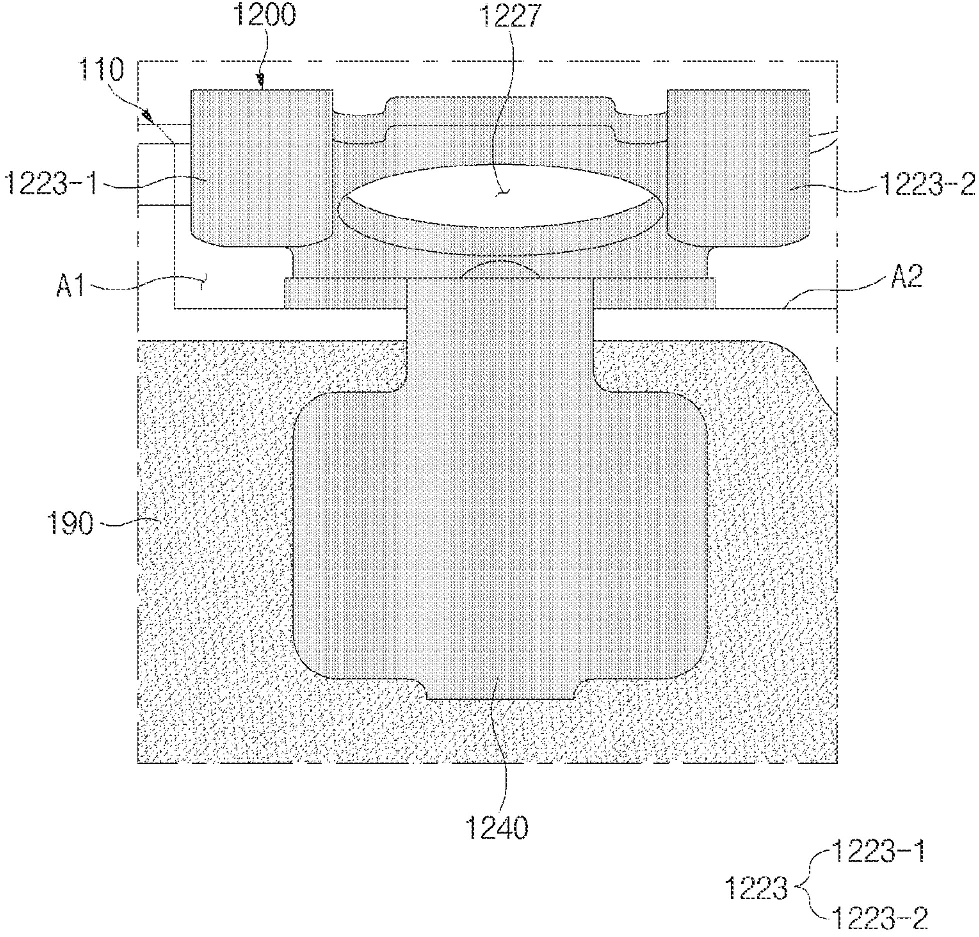
FIG. 11C is a diagram illustrating the connector seated on the housing according to various embodiments.
Figure 11D:
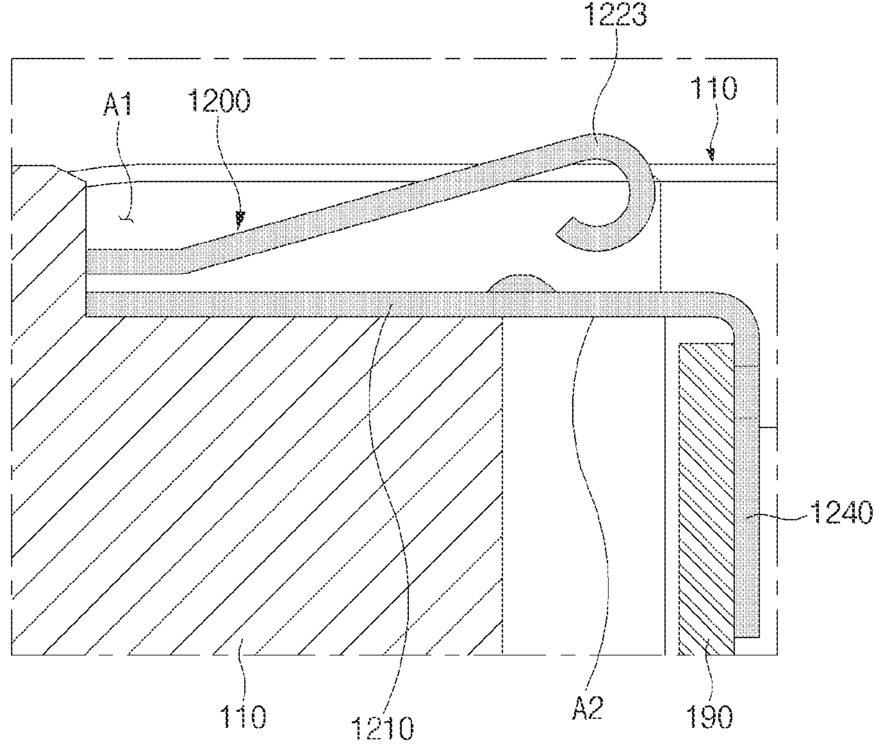
FIG. 11D is a cross-sectional view illustrating the connector seated on the housing according to various embodiments.

FIG. 11A is a partial perspective view illustrating the connector seated on the housing according to various embodiments. FIG. 11B is a partial perspective view illustrating the connector seated on the housing according to various embodiments. FIG. 11B may be an enlarged view of the connector of FIG. 11A. FIG. 11C is a diagram illustrating the connector seated on the housing according to various embodiments. FIG. 11C may be a side view of the connector as viewed in a direction perpendicular to the direction B in FIG. 11A. FIG. 11D is a diagram illustrating a sectional view of the connector seated on the housing according to various embodiments. FIG. 11D may be a sectional view taken along line A-A' of FIG. 11A.

Referring to FIGS. 11A, 11B, 11C, and 11D, the connector 1200 according to an embodiment may be disposed in the housing 110. The connector 1200 may be seated on the housing 110 such that the first hole 1217 and the second hole 1227 are aligned with the hole h formed in the housing 110. The connector 1200 may be at least partially accommodated in a recess A1 formed on the housing 110. The connector 1200 may be disposed on a seating surface A2 of the recess A1. For example, the connector 1200 may be accommodated in the recess A1 such that the base portion 1210 is disposed on the seating surface A2. The seating surface A2 may be formed to be substantially flat. Because the seating surface A2 and the base portion 1210 are formed to be substantially flat, the connector 1200 may be easily disposed on the seating surface A2 of the recess A1, and the assembly performance of the connector 1200 may be improved.

The base portion 1210 may be contacted with the seating surface A2. The seating surface A2 may include the metal portion 110*a* of the housing 110. For example, one area of the seating surface A2 with which the base portion 1210 is contacted may include the metal portion 110*a* of the housing 110. The connector 1200 may be contacted with and electrically connected with the metal portion 110*a* of the housing 110. The connector 1200 may be electrically connected to the substrate 190 through the connecting portion 1240 connected to the substrate 190. The metal portion 110*a* of the housing 110 (e.g., the first electrically conductive structure 291 of FIG. 6) and the substrate 190 (e.g., the second electrically conductive structure 292 of FIG. 6) may be electrically connected through the connector 1200.

In the state in which the connector 1200 is disposed in the housing 110, the third movable portion 1223 of the connector 1200 and the seating surface A2 of the housing 110 may at least partially face each other. As a screw (e.g., the screw 281 of FIG. 7) is fastened into the first hole 1217 and the second hole 1227 of the connector 1200 and the hole h formed in the seating surface A2, the third movable portion 1223 of the connector 1200 may be contacted with the seating surface A2 of the housing 110. Furthermore, the third movable portion 1223 of the connector 1200 may provide an elastic force to the housing 110 contacted with the third movable portion 1223.

Figure 12A:
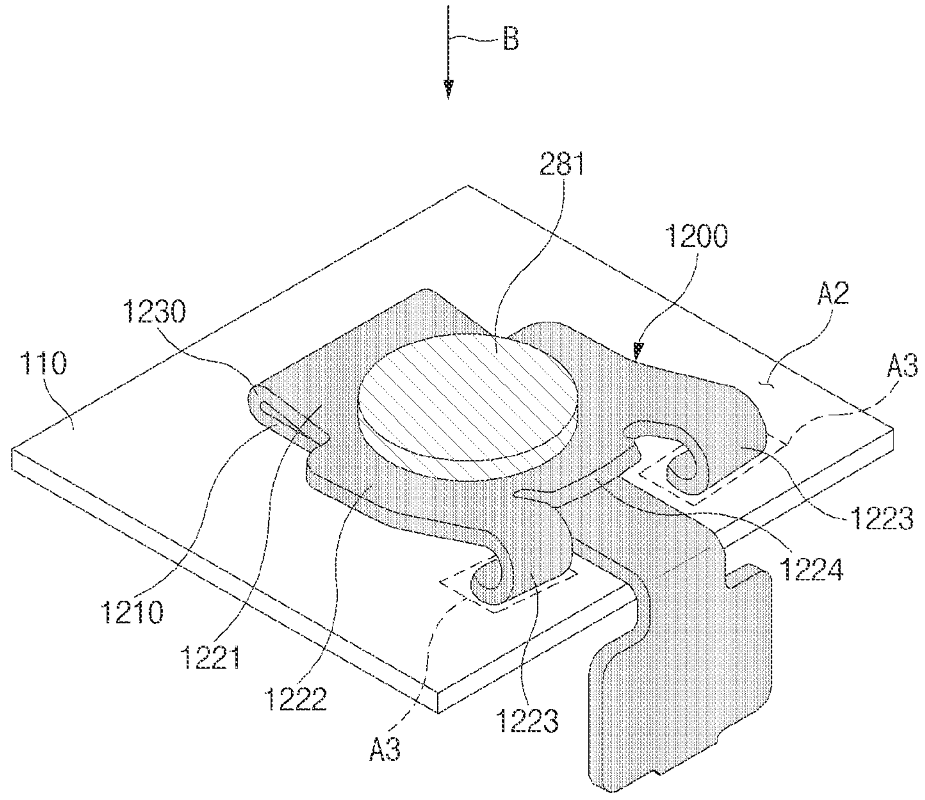
FIG. 12A is a perspective view illustrating the connector coupled to the housing according to various embodiments.
Figure 12B:
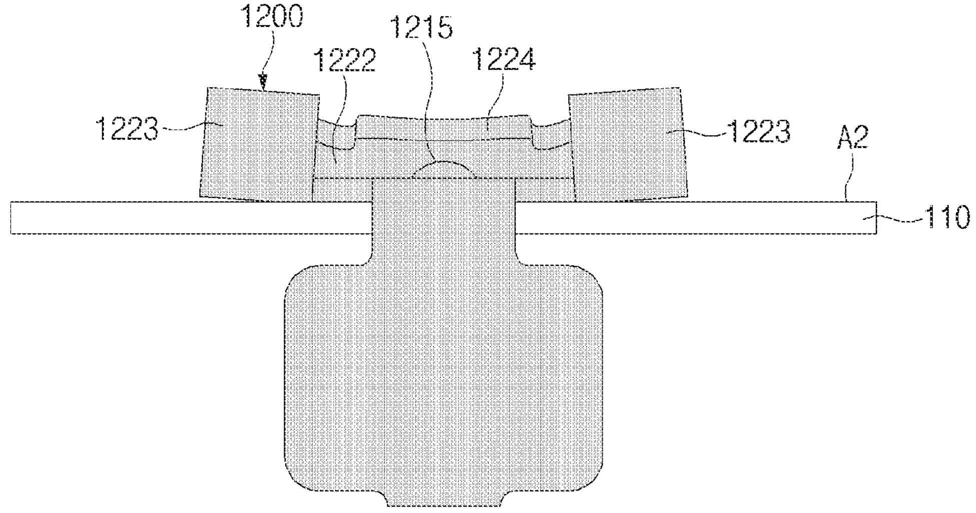
FIG. 12B is a diagram illustrating a side view of the connector coupled to the housing according to various embodiments.
Figure 12C:
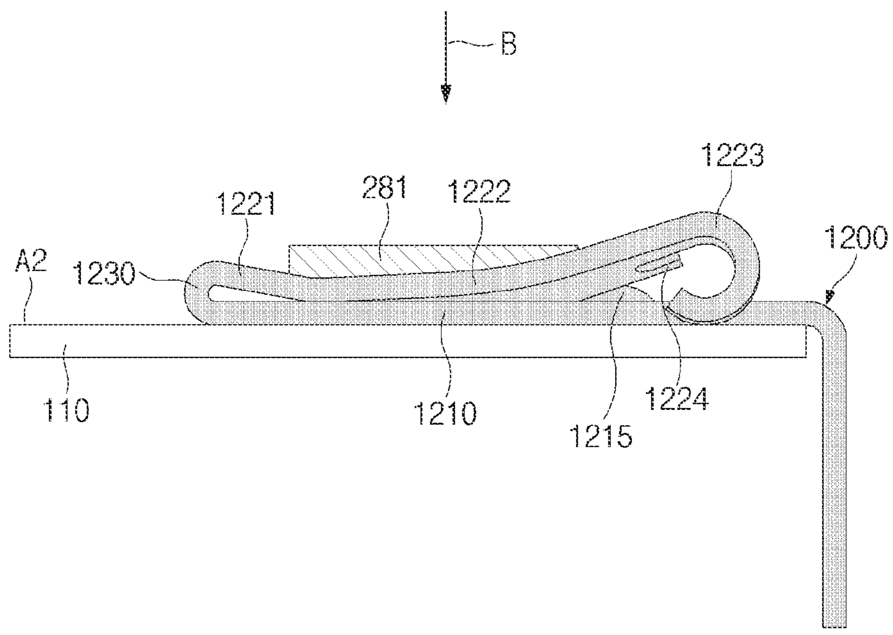
FIG. 12C is a diagram illustrating a side view of the connector coupled to the housing according to various embodiments.
Figure 12D:
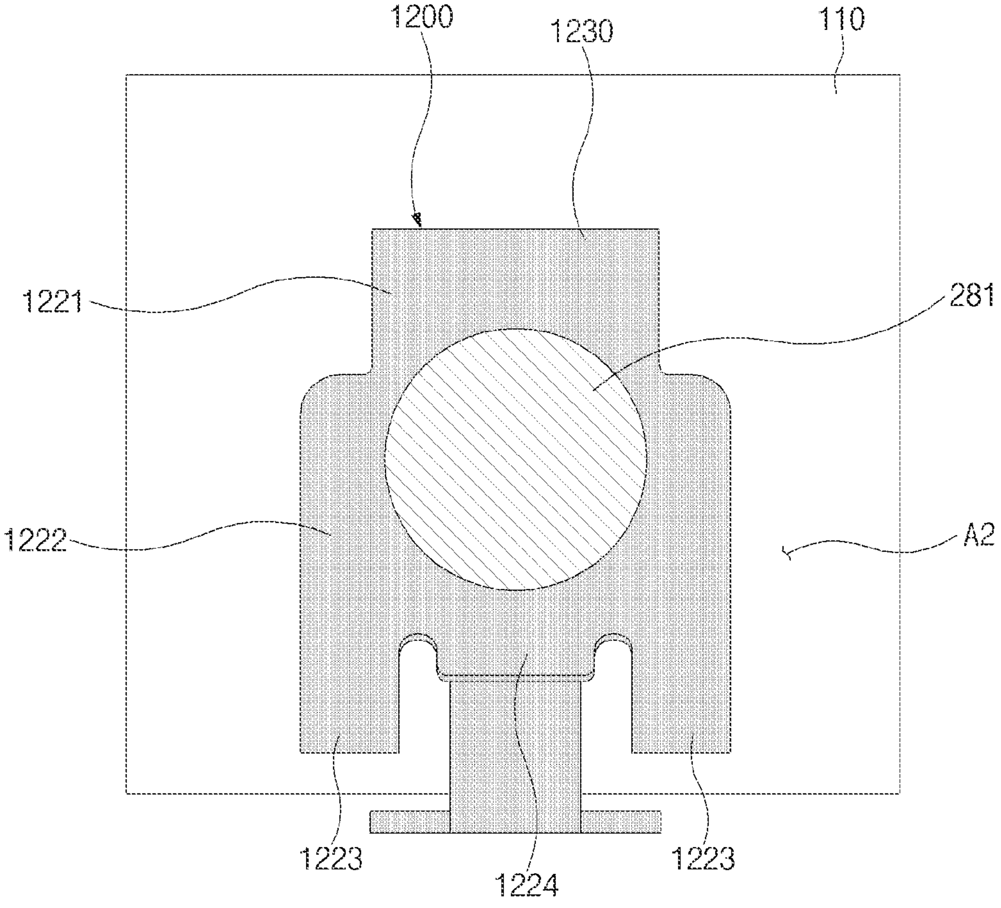
FIG. 12D is a diagram illustrating a top view of the connector coupled to the housing according to various embodiments.

FIG. 12A is a perspective view illustrating the connector coupled to the housing according to various embodiments. FIG. 12B is a diagram illustrating side view of the connector coupled to the housing according to various embodiments. FIG. 12B may be a view of the connector of FIG. 12A as viewed in a first direction perpendicular to the direction B. FIG. 12C is a diagram illustrating a side view of the connector coupled to the housing according to various embodiments. FIG. 12C may be a view of the connector of FIG. 12A as viewed in a second direction perpendicular to the direction B. FIG. 12D is a diagram illustrating a top view of the connector coupled to the housing according to various embodiments. FIG. 12D may be a view of the connector of FIG. 12A as viewed in the direction B. In FIGS. 12A, 12B, 12C, and 12D, the housing 110 is schematically illustrated. However, the housing 110 is not intended to be limited by the shape illustrated in the drawings.

Referring to FIGS. 12A, 12B, 12C, and 12D, the connector 1200 according to an embodiment may be coupled to the housing 110 through the screw 281. The screw 281 may pass through the second movable portion 1222 and the base portion 1210 of the connector 1200 and may be fastened to the housing 110. The first movable portion 1221 may be at least partially contacted with the base portion 1210. The second movable portion 1222 may be at least partially contacted with the base portion 1210. In an embodiment, the first movable portion 1221 may not be contacted with the base portion 1210, and only the second movable portion 1222 may be contacted with the base portion 1210.

When viewed in a direction perpendicular to the direction B, the third movable portion 1223 may overlap the base portion 1210, but is not limited thereto. For example, referring to FIG. 12A, an area A3 of the seating surface A2 with which the third movable portion 1223 is contacted may be formed to be higher than an area with which the base portion 1210 is contacted. In this case, when viewed in the direction perpendicular to the direction B, the third movable portion 1223 may not overlap the base portion 1210.

The third movable portion 1223 may be contacted with the housing 110. For example, the third movable portion 1223 may be contacted with the seating surface A2 of the housing 110. The third movable portion 1223 may provide an elastic force to the seating surface A2 of the housing 110.

As the screw 281 is fastened, a force may act on the connector 1200 in the direction B, and as the third movable portion 1223 contacts the housing 110, an elastic force may act in the direction opposite to the direction B. As the screw 281 is fastened, the connector 1200 may be at least partially deformed. For example, the bending portion 1230 may be deformed into a shape (e.g., the second point P2 of FIG. 8A) in which the degree of bending is increased. The first movable portion 1221 and the second movable portion 1222 may be deformed such that a boundary portion therebetween (e.g., the first point P1 of FIG. 8A) is close to the base portion 1210. The boundary portion may be contacted with the base portion 1210 depending on the degree to which the screw 281 is fastened. Furthermore, a boundary portion between the second movable portion 1222 and the third movable portion 1223 may be bent by an elastic force or a reaction force that acts between the housing 110 and the third movable portion 1223. The fourth movable portion 1224 may be deformed while being contacted with the embossing 1215. As the first movable portion 1221, the second movable portion 1222, the third movable portion 1223, and the fourth movable portion 1224 of the connector 1200 are deformed, at least the amount of plastic deformation of the bending portion 1230 may be decreased, and the reassembly performance of the connector 1200 may be improved. The descriptions provided with reference to FIG. 8A may be substantially identically, similarly, or correspondingly applied to detailed description thereabout.

Because the elastic force acts between the third movable portion 1223 and the housing 110 in the state in which the connector 1200 is coupled to the housing 110, the reliability of mechanical and electrical connection of the connector 1200 may be improved.

Figure 13:
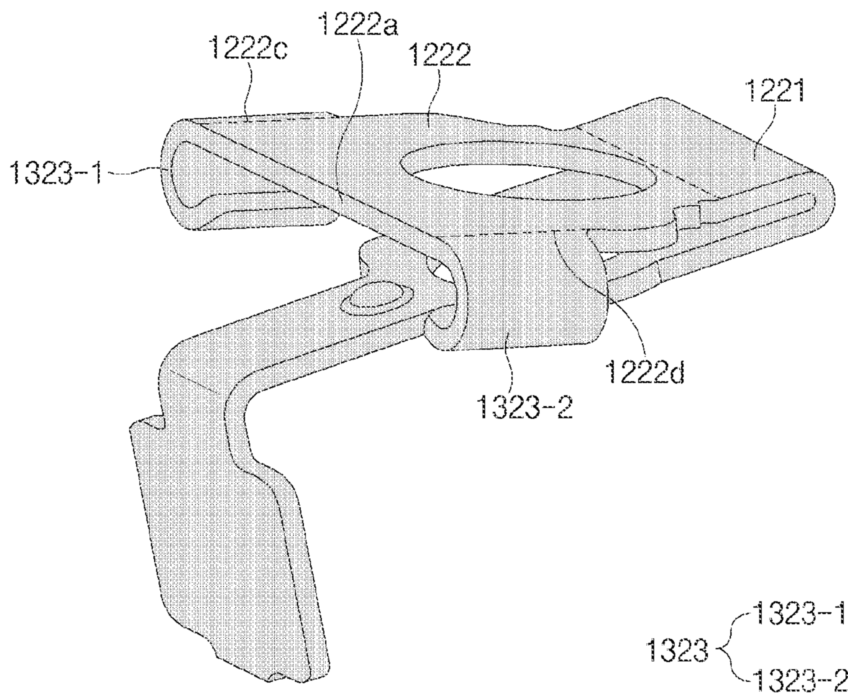
FIG. 13 is a perspective view illustrating a connector according to various embodiments.

FIG. 13 is a perspective view illustrating a connector according to various embodiments. Referring to FIG. 13, the connector 1300 according to an embodiment may include a third movable portion 1323. The third movable portion 1323 may extend from lateral portions of a second movable portion 1222 that face away from each other. For example, a first segment 1323-1 of the third movable portion 1323 may extend from a first lateral portion 1222*c* of the second movable portion 1222. A second segment 1323-2 of the third movable portion 1323 may extend from a second lateral portion 1222*d* facing away from the first lateral portion 1222*c*. The first lateral portion 1222*c* and the second lateral portion 1222*d* may extend from opposite sides of a first end portion 1222*a* of the second movable portion 1222 to a first movable portion 1221.

The first segment 1323-1 and the second segment 1323-2 of the third movable portion 1323 may extend from the second movable portion 1222 toward each other. The third movable portion 1323 may be configured to provide an elastic force to a portion (e.g., the housing 110 of FIG. 12A) contacted with the third movable portion 1323. In this regard, the descriptions provided with reference to the third movable portion 1223 may be substantially identically, similarly, or correspondingly applied. For example, the third movable portion 1323 may include a first portion (e.g., the first portion 1223*a* of FIG. 10A) extending from the second movable portion 1222, a second portion (e.g., the second portion 1223*b* of FIG. 10A) curvedly extending from the first portion, and a third portion (e.g., the third portion 1223*c* of FIG. 10A) extending in a lower place than the second movable portion 1222 from the second portion toward the second movable portion 1222.

Figure 14:
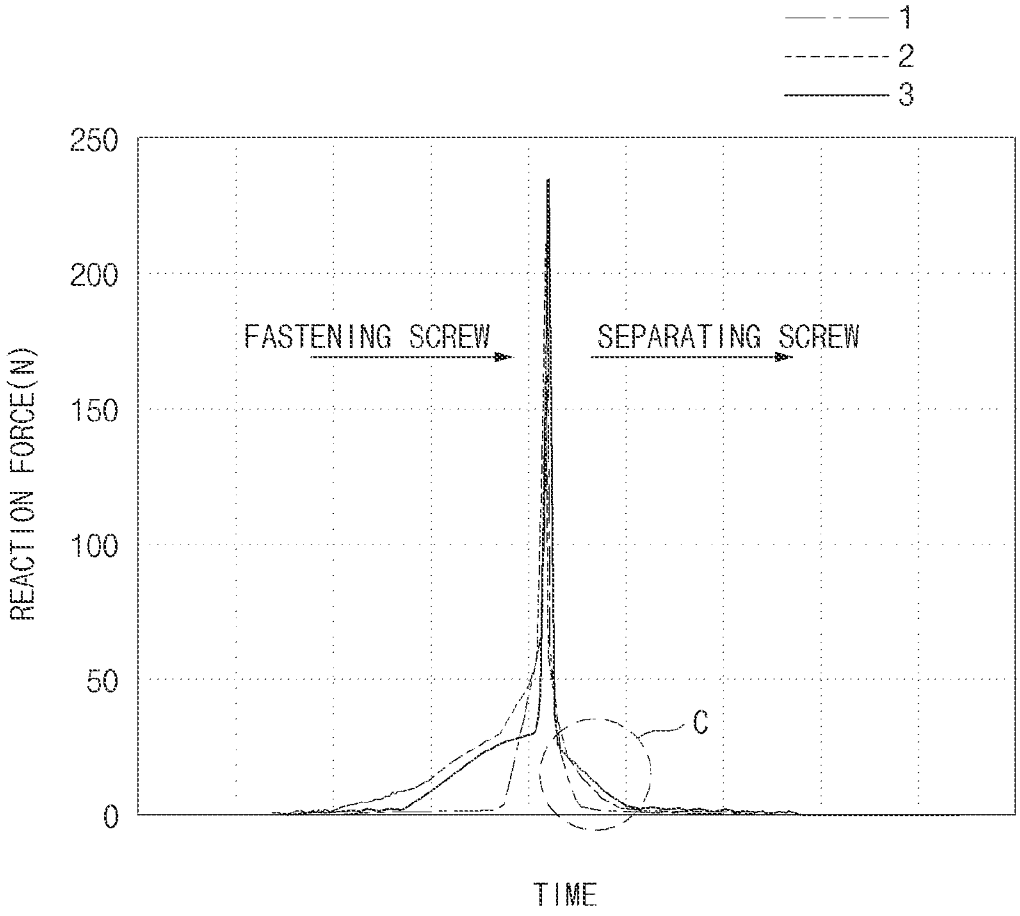
FIG. 14 is a graph illustrating reaction forces of connectors over time according to various embodiments.

FIG. 14 is a graph illustrating various reaction forces of connectors over time according various embodiments. FIG. 14 illustrates the reaction forces of the connectors over time in the case in which screws are fastened to and then separated from the connectors seated on housings. In FIG. 14, graph 1 depicts a reaction force of a connector according to a comparative example, graph 2 depicts a reaction force of the connector 1200 according to an embodiment, and graph 3 depicts a reaction force of the connector 1300 according to an embodiment. The connector according to the comparative example may not include a third movable portion (e.g., the third movable portion 1223 of FIG. 10A or the third movable portion 1323 of FIG. 13).

Referring to graph 1 and graph 2 in area C of FIG. 14, unlike the connector according to the comparative example, the connector 1200 according to an embodiment may provide a reaction force to a screw (e.g., the screw 281 of FIG. 12A) and/or a housing (e.g., the housing 110 of FIG. 12A) even after the screw is separated. Even though the screw is loosened, the contact pressure between the connector 1200 and the screw may be maintained due to an elastic force provided by the third movable portion 1223. Furthermore, even though the screw is loosened, the contact pressure between the connector 1200 and the housing 110 to which the connector 1200 is coupled may be maintained due to the elastic force provided by the third movable portion 1223.

Referring to graph 1 and graph 3 in area C of FIG. 14, unlike the connector according to the comparative example, the connector 1300 according to an embodiment may provide a reaction force to a screw (e.g., the screw 281 of FIG. 12A) and/or a housing (e.g., the housing 110 of FIG. 12A) even after the screw is separated. Even though the screw is loosened, the contact pressure between the connector 1300 and the screw may be maintained due to an elastic force provided by the third movable portion 1323. Furthermore, even though the screw is loosened, the contact pressure between the connector 1300 and the housing to which the connector 1300 is coupled may be maintained due to the elastic force provided by the third movable portion 1323.

As described above, the connector 1200 and the connector 1300 according to various embodiments may easily secure an effective contact distance of a screw required for the connector 1200 and the connector 1300 to be completely coupled to the housing. For example, even though the connector and the screw are configured to have a relatively short contact distance, the stability of mechanical and electrical coupling of the connector 1200 (or, the connector 1300) may be maintained due to an elastic force (or, contact pressure) provided by the third movable portion 1223 (or, the third movable portion 1323).

In various embodiments, the housing may include a first plate forming the front surface of the electronic device, a second plate forming the rear surface of the electronic device, and a side member surrounding a space between the first plate and the second plate, and the side member may include the metal portion.

An electronic device according to an example embodiment of the disclosure may include: a housing, a first electrically conductive structure comprising a conductive material and a second electrically conductive structure comprising a conductive material disposed in the housing, and a connector disposed in the housing. The connector may include: a base portion at least partially contacting the first electrically conductive structure, a first movable portion extending from the base portion at a first angle and extending to be inclined in a first direction away from the base portion, and a second movable portion extending from the first movable portion at a second angle, extending to be inclined in the first direction away from the first movable portion, and at least partially contacting the second electrically conductive structure. The second movable portion may be disposed in a state of being compressed by the second electrically conductive structure and may be configured to press the second electrically conductive structure in the first direction.

In various example embodiments, an embossing may be formed on the second movable portion to at least partially protrude in the first direction, and the embossing may at least partially contacts the second electrically conductive structure.

An electronic device according to an example embodiment (e.g., the electronic device 100 of FIG. 4) may include: a housing (e.g., the housing 110 of FIG. 4) including a metal portion (e.g., the metal portion 110*a* of FIG. 4) and a polymer portion (e.g., the polymer portion 110*b* of FIG. 4), a substrate (e.g., the substrate 190 of FIG. 4) disposed in the housing, a connector (e.g., the connector 200 of FIG. 4, the connector 1200 of FIG. 10A, or the connector 1300 of FIG. 13) disposed in the housing and electrically connecting the metal portion and the substrate, and a screw (e.g., the screw 281 of FIG. 6) configured to fasten the metal portion of the housing and the connector and to pass through the connector and at least a portion of the metal portion. The connector may include: a base portion (e.g., the base portion 210 of FIG. 5A) seated on the metal portion and through which the screw configured to pass, a movable portion (e.g., the movable portion 220 of FIG. 5A) at least partially facing the base portion and through which the screw is configured to pass, a bending portion (e.g., the bending portion 230 of FIG. 5A) connecting one side of the base portion and the movable portion, and a connecting portion (e.g., the connecting portion 240 of FIG. 5A) extending from an opposite side of the base portion and connected to the substrate.

In an example embodiment, the movable portion may include a first movable portion (e.g., the first movable portion 221 of FIG. 5A) connected to the bending portion and a second movable portion (e.g., the second movable portion 222 of FIG. 5A) obliquely extending from the first movable portion at a specified angle.

In an example embodiment, each of the first movable portion and the second movable portion may at least partially overlap the base portion when viewed in a penetration direction of the screw (e.g., the penetration direction A of FIG. 6).

In an example embodiment, each of the first movable portion and the second movable portion may at least partially contact the base portion in a state in which the screw is completely fastened.

In an example embodiment, the screw may pass through the second movable portion.

In an example embodiment, the second movable portion may be configured such that a distance from the base portion is increased away from the first movable portion.

In an example embodiment, the specified angle may be greater than 0 degrees.

In an example embodiment, the first movable portion may be substantially parallel to the base portion.

In an example embodiment, an embossing (e.g., the embossing 215 of FIG. 5A) protruding toward the second movable portion to contact the second movable portion may be formed on the base portion.

In an example embodiment, the base portion may include an extending portion (e.g., the extending portion 212 of FIG. 5A) extending to the connecting portion from an area where the embossing is formed, and the extending portion may have a width less than a width of the base portion.

In an example embodiment, the connecting portion may face a different direction from the base portion, and the extending portion may be at least partially bent.

In an example embodiment, the movable portion may be configured to be inclined such that a distance from the base portion is increased away from the bending portion.

In an example embodiment, a head of the screw (e.g., the head 282 of FIG. 6) may press the movable portion such that the movable portion at least partially contacts the base portion, and the movable portion may be configured to press the head of the screw in a direction opposite to a penetration direction of the screw.

In an example embodiment, the base portion may include an embossing (e.g., the embossing 215 of FIG. 6) protruding toward the movable portion, and the movable portion may at least partially contact the embossing in a state in which the screw is completely fastened.

In an example embodiment, the connecting portion may be electrically connected to a ground area of the substrate.

In an example embodiment, the connecting portion may be soldered to a ground pad located on a surface of the substrate.

In an example embodiment, a first hole (e.g., the first hole 217 of FIG. 5A) may be formed in the base portion, and a second hole (e.g., the second hole 227 of FIG. 5A) may be formed in the movable portion to be at least partially aligned with the first hole in an insertion direction of the screw.

In an example embodiment, the housing may include a first plate (e.g., the front plate 120 of FIG. 3) forming a front surface of the electronic device, a second plate (e.g., the back plate 180 of FIG. 3) forming a rear surface of the electronic device, and a side support (e.g., the side bezel structure 118 of FIG. 3) surrounding a space between the first plate and the second plate, and the side support may include the metal portion.

In an example embodiment, the connector may include a third movable portion (e.g., the third movable portion 1223 of FIG. 10A or the third movable portion 1323 of FIG. 13) extending from the movable portion and contacting the metal portion of the housing, and the third movable portion may be configured to provide an elastic force to the metal portion contacted with the third movable portion.

In an example embodiment, the third movable portion may include a first portion (e.g., the first portion 1223*a* of FIG. 10A) extending from the second movable portion, a second portion (e.g., the second portion 1223*b* of FIG. 10A) curvedly extending from the first portion toward the base portion, and a third portion (e.g., the third portion 1223*c* of FIG. 10A) extending from the second portion to face the second movable portion.

In an example embodiment, the connector may include an embossing (e.g., the embossing 1215 of FIG. 10A) protruding from the base portion toward the second movable portion and a fourth movable portion (e.g., the fourth movable portion 1224 of FIG. 10A) extending from a first end portion of the second movable portion to overlap the embossing, wherein the third movable portion may include a first segment (e.g., the first segment 1223-1 of FIG. 10A) and a second segment (e.g., the second segment 1223-2 of FIG. 10A) extending from the first end portion of the second movable portion with the fourth movable portion therebetween.

In an example embodiment, the second movable portion may include a first end portion (e.g., the first end portion 1222*a* of FIG. 13), a first lateral portion (e.g., the first lateral portion 1222*c* of FIG. 13) extending from one side of the first movable portion to one side of the first end portion, and a second lateral portion (e.g., the second lateral portion 1222*d* of FIG. 13) facing away from the first lateral portion and extending from an opposite side of the first movable portion to an opposite side of the first end portion. The third movable portion may include a first segment (e.g., the first segment 1323-1 of FIG. 13) extending from the first lateral portion and a second segment (e.g., the second segment 1323-2 of FIG. 13) extending from the second lateral portion.

An electronic device according to an example embodiment (e.g., the electronic device 100 of FIG. 4) may include: a housing (e.g., the housing 110 of FIG. 4), a first electrically conductive structure (e.g., the first electrically conductive structure of FIG. 9) comprising a conductive material and a second electrically conductive structure comprising a conductive material (e.g., the second electrically conductive structure 292 of FIG. 9) disposed in the housing, and a connector (e.g., the connector 300 of FIG. 9) disposed in the housing. The connector may include: a base portion (e.g., the base portion 310 of FIG. 9) at least partially contacting the first electrically conductive structure, a first movable portion (e.g., the first movable portion 320 of FIG. 9) extending from the base portion at a first angle (e.g., the first angle $\theta_1$ of FIG. 9) and extending to be inclined in a first direction away from the base portion, and a second movable portion (e.g., the second movable portion 330 of FIG. 9) extending from the first movable portion at a second angle (e.g., the second angle $\theta_2$ of FIG. 9), extending to be inclined in the first direction away from the first movable portion, and at least partially contacting the second electrically conductive structure. The second movable portion may be disposed in a state of being compressed by the second electrically conductive structure and may be configured to press the second electrically conductive structure in the first direction.

In an example embodiment, an embossing (e.g., the embossing 315 of FIG. 9) may be formed on the second movable portion to at least partially protrude in the first direction, and the embossing may at least partially contact the second electrically conductive structure.

Figure 15:
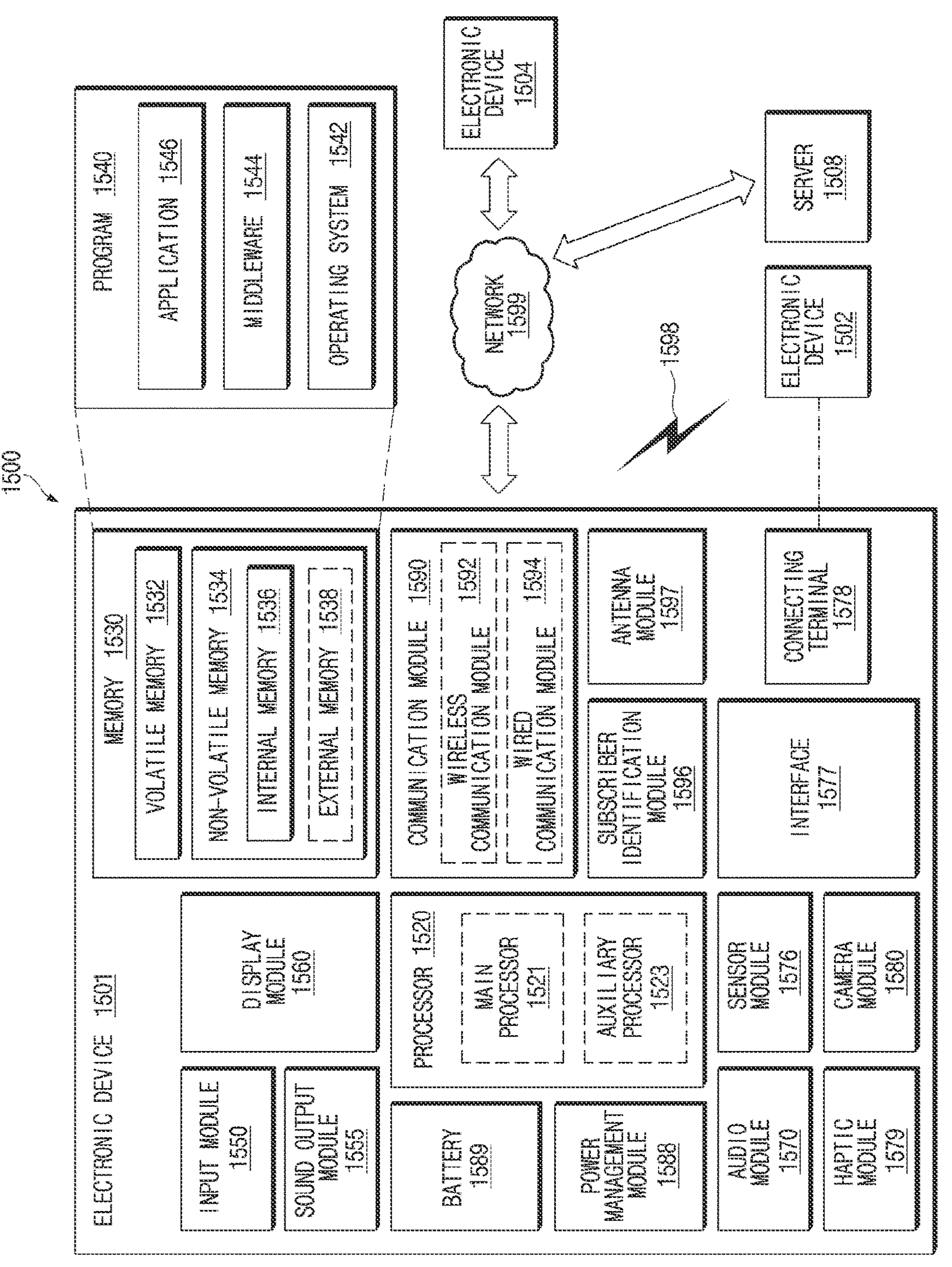
FIG. 15 is a block diagram illustrating an example electronic device in a network environment according to various embodiments.

FIG. 15 is a block diagram illustrating an example electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In various embodiments, at least one of the components (e.g., the connecting terminal 1578) may be omitted from the electronic device 1501, or one or more other components may be added in the electronic device 1501. In various embodiments, some of the components (e.g., the sensor module 1576, the camera module 1580, or the antenna module 1597) may be implemented as a single component (e.g., the display module 1560).

The processor 1520 may include various processing circuitry. For example, as used herein, including the claims, the term "processor" may include various processing circuitry, including at least one processor, wherein one or more of at least one processor may be configured to perform various functions described herein. Additionally, the at least one processor may include a combination of processors performing various of the recited/disclosed functions. At least one processor may execute program instructions to achieve or perform various functions. The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to an embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element including a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In an embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing including a metal portion and a polymer portion;

a substrate disposed in the housing;

a connector disposed in the housing and configured to electrically connect the metal portion and the substrate; and a screw configured to fasten the metal portion of the housing and the connector, wherein the screw passes through the connector and at least a portion of the metal portion, wherein the connector includes: a base portion seated on the metal portion and through which the screw is configured to pass, a movable portion configured to at least partially face the base portion and through which the screw is configured to pass, a bending portion connecting one side of the base portion and the movable portion, and a connecting portion extending from an opposite side of the base portion and connected to the substrate.

2. The electronic device of claim 1, wherein the movable portion includes a first movable portion connected to the bending portion and a second movable portion obliquely extending from the first movable portion at a specified angle.

3. The electronic device of claim 2, wherein each of the first movable portion and the second movable portion at least partially overlap the base portion when viewed in a penetration direction of the screw.

4. The electronic device of claim 2, wherein each of the first movable portion and the second movable portion at least partially contact the base portion in a state in which the screw is completely fastened.

5. The electronic device of claim 2, wherein the screw is configured to pass through the second movable portion.

6. The electronic device of claim 2, wherein the second movable portion is configured such that a distance from the base portion is increased away from the first movable portion.

7. The electronic device of claim 2, wherein the first movable portion is substantially parallel to the base portion.

8. The electronic device of claim 2, wherein an embossing protruding toward the second movable portion to contact the second movable portion is formed on the base portion.

9. The electronic device of claim 1, wherein the movable portion is inclined such that a distance from the base portion is increased away from the bending portion.

10. The electronic device of claim 1, wherein a head of the screw is configured to press the movable portion such that the movable portion at least partially contacts the base portion, and the movable portion is configured to press the head of the screw in a direction opposite to a penetration direction of the screw.

11. The electronic device of claim 1, wherein the housing includes a first plate configured to form a front surface of the electronic device, a second plate configured to form a rear surface of the electronic device, and a side support surrounding a space between the first plate and the second plate, and the side support includes the metal portion.

12. The electronic device of claim 2, wherein the connector includes a third movable portion extending from the movable portion and contacting the metal portion of the housing, and the third movable portion is configured to provide an elastic force to the metal portion contacted with the third movable portion.

13. The electronic device of claim 12, wherein the third movable portion includes a first portion extending from the second movable portion, a second portion curvedly extending from the first portion toward the base portion, and a third portion extending from the second portion to face the second movable portion.

14. The electronic device of claim 12, wherein the connector includes:

an embossing protruding from the base portion toward the second movable portion; and a fourth movable portion extending from a first end portion of the second movable portion to overlap the embossing, and the third movable portion includes a first segment and a second segment extending from the first end portion of the second movable portion with the fourth movable portion therebetween.

15. The electronic device of claim 12, wherein the second movable portion includes a first end portion, a first lateral portion extending from one side of the first movable portion to one side of the first end portion, and a second lateral portion facing away from the first lateral portion and extending from an opposite side of the first movable portion to an opposite side of the first end portion, and the third movable portion includes a first segment extending from the first lateral portion and a second segment extending from the second lateral portion.

16. The electronic device of claim 8, wherein the base portion includes an extending portion extending to the connecting portion from an area where the embossing is formed, and the extending portion has a width less than a width of the base portion.

17. The electronic device of claim 16, wherein the connecting portion faces a different direction from the base portion, and the extending portion is at least partially bent.

18. The electronic device of claim 10, wherein the base portion includes an embossing protruding toward the movable portion, and the movable portion at least partially contacts the embossing in a state in which the screw is completely fastened.

19. The electronic device of claim 1, wherein the connecting portion is electrically connected to a ground area of the substrate.

20. The electronic device of claim 1, wherein a first hole is formed in the base portion, and a second hole is formed in the movable portion and at least partially aligned with the first hole in an insertion direction of the screw.

* * * * *